United States Patent
Zhao

(10) Patent No.: US 12,501,344 B2
(45) Date of Patent: Dec. 16, 2025

(54) ELECTRONIC SPORTS DATA PROCESSING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventor: Qian Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 242 days.

(21) Appl. No.: 18/356,307

(22) Filed: Jul. 21, 2023

(65) Prior Publication Data
US 2023/0362790 A1 Nov. 9, 2023

Related U.S. Application Data

(63) Continuation of application No. PCT/CN2022/102828, filed on Jun. 30, 2022.

(30) Foreign Application Priority Data

Jul. 19, 2021 (CN) .......................... 202110813265.3

(51) Int. Cl.
*H04W 48/04* (2009.01)
*H04L 67/131* (2022.01)
*H04L 67/14* (2022.01)

(52) U.S. Cl.
CPC ........... *H04W 48/04* (2013.01); *H04L 67/131* (2022.05); *H04L 67/14* (2013.01)

(58) Field of Classification Search
CPC ..... H04W 48/04; H04W 12/08; H04W 12/06; H04W 40/24; H04W 40/02; H04L 67/131;
(Continued)

(56) References Cited

U.S. PATENT DOCUMENTS

2017/0318325 A1* 11/2017 Ortiz .................... H04N 21/436
2020/0404675 A1   12/2020 Ou et al.
(Continued)

FOREIGN PATENT DOCUMENTS

CN   109275160 A   1/2019
CN   109286567 A   1/2019
(Continued)

OTHER PUBLICATIONS

3rdGenerationPartnershipProject;TechnicalSpecificationGroupServicesandSystemAspects; Studyon5GNetworksProvidingAccesstoLocalizedServices;Stage1(Release18),RetrievedfromtheInternet:URL: https://ftp.3gpp.org/Specs/archive/22_series/22.844/22844-i01.zip22844-i01.doc[retrievedonJun. 24, 2021] (Year: 2021).*
(Continued)

*Primary Examiner* — Cheikh T Ndiaye
(74) *Attorney, Agent, or Firm* — Anova Law Group, PLLC

(57) ABSTRACT

An electronic sports data processing method includes, in response to an electronic sports terminal in a target local electronic sports region being determined by a 5G private network to satisfy a terminal access condition, receiving electronic sports service data carrying access identification information transmitted by the electronic sports terminal, searching, in service routing information associated with a target base station in the target local electronic sports region,
(Continued)

for target service routing information that is same as the access identification information, and transmitting the electronic sports service data to a target local electronic sports server corresponding to the access identification information upon finding the target service routing information, so that the target local electronic sports server obtains electronic sports response data of an electronic sports service based on the electronic sports service data.

20 Claims, 9 Drawing Sheets

(58) Field of Classification Search
CPC ......... H04L 67/14; H04L 67/10; H04L 67/55; H04L 67/563; H04L 45/308
See application file for complete search history.

(56) References Cited

U.S. PATENT DOCUMENTS

| | | | |
|---|---|---|---|
| 2021/0045193 A1 | 2/2021 | Mishra et al. | |
| 2021/0184965 A1 | 6/2021 | Wang | |
| 2022/0217611 A1 | 7/2022 | Lu et al. | |
| 2022/0231763 A1 | 7/2022 | Luo et al. | |
| 2022/0417757 A1* | 12/2022 | Gupta | H04W 16/02 |
| 2023/0362790 A1 | 11/2023 | Zhao | |

FOREIGN PATENT DOCUMENTS

| | | |
|---|---|---|
| CN | 109561430 A | 4/2019 |
| CN | 111083120 A | 4/2020 |
| CN | 111698694 A | 9/2020 |
| CN | 111770545 A | 10/2020 |
| CN | 112437456 A | 3/2021 |
| CN | 113573378 A | 10/2021 |
| WO | 2020248529 A1 | 12/2020 |
| WO | 2021057794 A1 | 4/2021 |

OTHER PUBLICATIONS

GSM Association,GSM Association, GSMAFloor2theWalbrookBuilding25WallbrookLondon,UK, Feb. 21, 2021(Feb. 21, 2021), (Year: 2021).*
The World Intellectual Property Organization (WIPO) International Search Report for PCT/CN2022/102828 Sep. 21, 2022 7 Pages (including translation).
The State Intellectual Property Office of the People's Republic of China (SIPO) Office Action 1 for 202110813265.3 Feb. 21, 2024 8 Pages (including translation).
The European Patent Office (EPO) The Extended European Search Report for 22845113.4 Jul. 22, 2024 12 Pages.
"3rd Generation Partnership Project; Technical Specification Group Services and System Aspects; Study on 5G Networks Providing Access to Localized Services; Stage 1 (Release 18)", 3GPP Standard; Technical Report; 3GPP TR 22.844, 3rd Generation Partnership Project (3GPP), Mobile Competence Centre; 650, Route Des Lucioles; F-06921 Sophia Antipolis Cedex; France, No. V18.0.1, Jun. 24, 2021 (Jun. 24, 2021).
GSM Association, GSM Association, GSMA Floor2 the Walbrook Building 25 Wallbrook London, UK, Feb. 21, 2021 (Feb. 21, 2021).
"3rd Generation Partnership Project; Technical Specification Group Services and System Aspects; Feasibility Study on Business Role Models for Network Slicing (Release 16)", 3GPP Draft; TR 22.830 V0.2.0 FS_BMNS RM, 3rd Generation Partnership Project (3GPP), Mobile Competence Centre; 650, Route Des Lucioles; F-06921 Sophia Antipolis Cedex; France, Feb. 12, 2018 (Feb. 12, 2018).

* cited by examiner

ELECTRONIC SPORTS DATA PROCESSING METHOD AND APPARATUS, DEVICE, AND STORAGE MEDIUM

CROSS-REFERENCE TO RELATED APPLICATIONS

This application is a continuation of International Application No. PCT/CN2022/102828, filed on Jun. 30, 2022, which claims priority to Chinese Patent Application No. 202110813265.3, entitled "ELECTRONIC SPORTS DATA PROCESSING METHOD AND APPARATUS, DEVICE, AND STORAGE MEDIUM" filed with the China National Intellectual Property Administration on Jul. 19, 2021, which are incorporated herein by reference in their entirety.

FIELD OF THE TECHNOLOGY

This application relates to the field of computer technologies, and in particular, to an electronic sports data processing method and apparatus, a device, and a storage medium.

BACKGROUND OF THE DISCLOSURE

In order to reduce interference caused by wireless communication technology (such as Wi-Fi) to mobile games, the 5th generation mobile communication technology (5G) program may be used as an access means for executing electronic sports services. Conventional 5G private network programs may deploy a 5G private network in an electronic sports region (such as an electronic sports venue) used for executing an electronic sports service, and an electronic sports terminal in the electronic sports venue is able to execute the electronic sports service based on the 5G private network, whereby low latency and stability required during the execution of the electronic sports service can be effectively ensured. In order to ensure that the execution of the electronic sports service is not affected by external settings, a 5G core network needs to be deployed locally in the electronic sports venue to manage locally an account system used by the electronic sports terminal.

With the vigorous development of the electronic sports industry, electronic sports venues are built in more and more places. When a 5G private network program needs to be deployed in each electronic sports venue, a 5G core network needs to be deployed in each electronic sports venue, resulting in high deployment costs.

SUMMARY

In accordance with the disclosure, there is provided an electronic sports data processing method performed by a computer device, including, in response to an electronic sports terminal in a target local electronic sports region being determined by a 5G private network to satisfy a terminal access condition, receiving electronic sports service data carrying access identification information transmitted by the electronic sports terminal, searching, in service routing information associated with a target base station in the target local electronic sports region, for target service routing information that is same as the access identification information, and transmitting the electronic sports service data to a target local electronic sports server corresponding to the access identification information upon finding the target service routing information, so that the target local electronic sports server obtains electronic sports response data of an electronic sports service based on the electronic sports service data. The target local electronic sports region is one of at least two local electronic sports regions deployed in the 5G private network.

Also in accordance with the disclosure, there is provided a computer device including one or more memories storing one or more computer-readable instructions and one or more processors configured to execute the one or more instructions to, in response to an electronic sports terminal in a target local electronic sports region being determined by a 5G private network to satisfy a terminal access condition, receive electronic sports service data carrying access identification information transmitted by the electronic sports terminal, search, in service routing information associated with a target base station in the target local electronic sports region, for target service routing information that is same as the access identification information, and transmit the electronic sports service data to a target local electronic sports server corresponding to the access identification information upon finding the target service routing information, so that the target local electronic sports server obtains electronic sports response data of an electronic sports service based on the electronic sports service data. The target local electronic sports region is one of at least two local electronic sports regions deployed in the 5G private network.

Also in accordance with the disclosure, there is provided one or more non-volatile readable storage medium storing one or more computer-readable instructions that, when executed by one or more processors, cause the one or more processors to, in response to an electronic sports terminal in a target local electronic sports region being determined by a 5G private network to satisfy a terminal access condition, receive electronic sports service data carrying access identification information transmitted by the electronic sports terminal, search, in service routing information associated with a target base station in the target local electronic sports region, for target service routing information that is same as the access identification information, and transmit the electronic sports service data to a target local electronic sports server corresponding to the access identification information upon finding the target service routing information, so that the target local electronic sports server obtains electronic sports response data of an electronic sports service based on the electronic sports service data. The target local electronic sports region is one of at least two local electronic sports regions deployed in the 5G private network.

BRIEF DESCRIPTION OF THE DRAWINGS

To describe the technical solutions in the embodiments of this application more clearly, the following briefly introduces the accompanying drawings for describing the embodiments. Apparently, the accompanying drawings in the following description show merely some embodiments of this application, and a person of ordinary skill in the art may still derive other drawings from the accompanying drawings without creative efforts.

DESCRIPTION OF EMBODIMENTS

Figure 1:
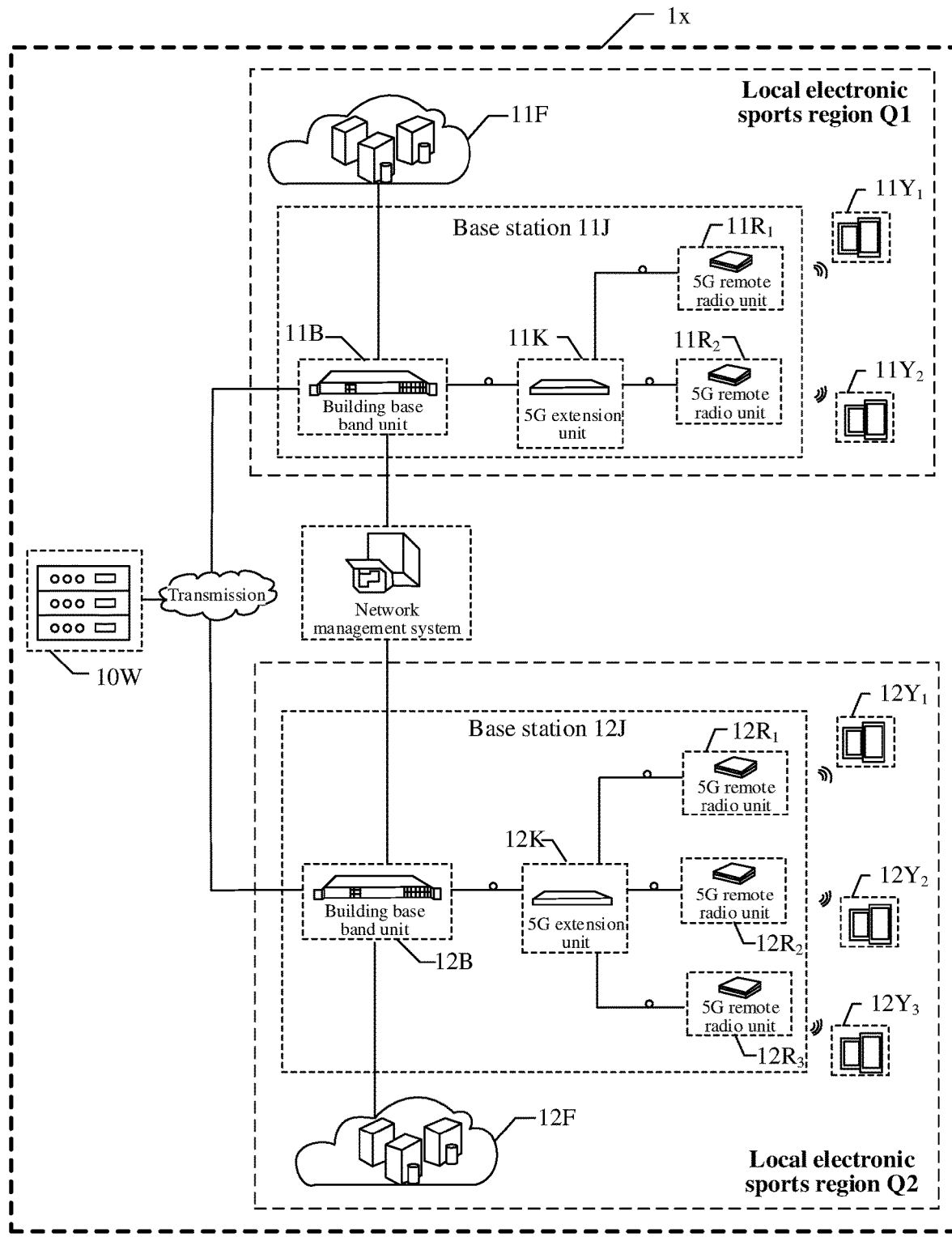
FIG. 1 is a schematic diagram showing a network architecture of a communication system according to an embodiment of this application.

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts fall within the protection scope of this application.

A 5G private network base station distribution program in the embodiments of this application may build a complete network and program in a plurality of local electronic sports regions by renting a frequency band of an operator or using a frequency band of a private network, to completely separate from data and traffic of a public network, so as to ensure independence of the network and improve security and privacy of data transmission. The plurality of local electronic sports regions in the 5G private network may be used for executing electronic sports services, and the electronic sports service executed in each local electronic sports region may be the same or different. Each local electronic sports region may be deployed with an electronic sports terminal for executing an electronic sports service, a base station for data distribution, and a local electronic sports server corresponding to the electronic sports service. When receiving electronic sports service data sent through the local base station, the local electronic sports server in any local electronic sports region may determine electronic sports response data corresponding to the electronic sports service based on cloud technology, which is suitable for the data computing field in big data.

The 5G core network in the 5G private network base station distribution program may be deployed in a cloud. N local electronic sports regions share a set of 5G core network, and their account systems, card activation, and account activation are all performed in the cloud, so that the N local electronic sports regions can share a set of electronic sports card, such as a mobile card, where N is a positive integer. That is, electronic sports users may use the same electronic sports card to participate in, through electronic sports terminals that satisfy terminal access conditions, a plurality of electronic sports services in the N local electronic sports regions deployed in the 5G private network, without changing the electronic sports card in each local electronic sports region. The cloud deployment may be likened to a hybrid cloud. The hybrid cloud integrates a public cloud and a private cloud, and has become the main mode and development direction of cloud computing in recent years. The private cloud is mainly oriented to enterprise users. Considering security, enterprises are more willing to store data in the private cloud, but also desire to obtain computing resources of the public cloud. In this case, the hybrid cloud has been extensively used. The hybrid cloud mixes and matches the public cloud and the private cloud to obtain optimal effects. This personalized solution achieves the purposes of money saving and security.

In the embodiments of this application, an electronic sports client associated with an electronic sports service may be a game client running in an electronic sports terminal, or a cloud game running in a local electronic sports server (namely, a cloud server). Cloud gaming, also known as gaming on demand, is an online gaming technology based on cloud computing technology. The cloud gaming technology enables a thin client with relatively limited graphics processing and data computing capabilities to run high-quality games. In a cloud gaming scenario, the game does not run in a player's gaming terminal, but in a cloud server, and the cloud server renders the gaming scenario as a video and audio stream and transmits the video and audio stream to the player's gaming terminal through a network. The player's gaming terminal does not need to have strong graphics computing and data processing capabilities, but only need to have basic streaming media playback capabilities and capabilities of obtaining player input instructions and sending the player input instructions to the cloud server.

Refer to FIG. 1. FIG. 1 is a schematic diagram showing a network architecture of a communication system according to an embodiment of this application. As shown in FIG. 1, the communication system in this embodiment of this application, such as a communication system 1X, may include but is not limited to a 5G communication system. A 5G private network corresponding to the communication system 1X may include a management terminal, a network management system, and a 5G core network configured to serve N local electronic sports regions, for example, a 5G core network 10W deployed in a cloud as shown in FIG. 1, where N is a positive integer. As shown in FIG. 1, 2 local electronic sports regions in this embodiment of this application may be used as an example, specifically including a first local electronic sports region (such as local electronic sports region $Q_1$) and a second local electronic sports region (such as local electronic sports region $Q_2$).

Each user equipment deployed in the N local electronic sports regions and the management terminal deployed in the 5G private network may include: at least one intelligent terminal with data processing function, such as a smart phone, a tablet computer, a laptop computer, or a desktop computer. An electronic sports terminal may be configured to execute an electronic sports service in the local electronic sports region, and a user corresponding to the electronic sports terminal may be referred to as an electronic sports user. The management terminal may be configured to manage the communication system 1X shown in FIG. 1, and a user corresponding to the management terminal may be referred to as a management user. The electronic sports service may refer to an electronic sports service executed by an electronic sports client. For example, when the electronic sports client is a shooting game client, the electronic sports service may be a shooting competition service executed by the shooting game client, such as a gunfight service. When the electronic sports client is a racing game client, the electronic sports service may be a speed competition service executed by the racing game client, such as a racing service.

The management user may log in to the network management system shown in FIG. 1 and set each base station in the N local electronic sports regions of the communication system 1X and network elements in the 5G core network 10W. The network management system in the 5G private network may include a first network management platform and a second network management platform, which are different from each other. For example, the first network management platform may be a 5G core network management platform. The 5G core network management platform may be deployed in the cloud or locally. The management user corresponding to the management terminal may set the network elements in the 5G core network 10W shown in FIG. 1 on the 5G core network management platform to obtain first setting information. The first setting information may include at least one kind of parameter information set by the management user and having an access permission, such as card information, signal strength, spectrum, bandwidth, and signal-to-noise ratio. The second network management platform may be a local base station network management platform, and the management user may perform distribution configuration for each base station in the N local electronic sports regions shown in FIG. 1 on the base station network management platform to obtain second setting information. The second setting information may include at least one kind of parameter information such as channel, signal-to-noise ratio, and amplification power.

The electronic sports service corresponding to the local electronic sports region $Q_1$ may be referred to as a first electronic sports service. As shown in FIG. 1, the local electronic sports region $Q_1$ includes a first electronic sports terminal cluster, a base station 11J, and a local electronic sports server 11F corresponding to the first electronic sports service. A quantity of electronic sports terminals in the local electronic sports region $Q_1$ may be $M_1$, where $M_1$ is a positive integer. The $M_1$ electronic sports terminals may include a plurality of electronic sports clusters belonging to different electronic sports camps. For example, the $M_1$ electronic sports terminals may include an electronic sports cluster $11Y_1$ and an electronic sports cluster $11Y_2$ as shown in FIG. 1. The electronic sports cluster $11Y_1$ and the electronic sports cluster $11Y_2$ belong to different electronic sports camps.

The base station 11J in the local electronic sports region $Q_1$ may include $E_1$ 5G remote radio units (RRUs), a 5G extension unit 11K, and a building base band unit (BBU) 11B, where $E_1$ is a positive integer. The $E_1$ RRUs include an RRU $11R_1$ and an RRU $11R_2$ as shown in FIG. 1. As shown in FIG. 1, for each of the $E_1$ RRUs, the RRU may be configured to communicate with the electronic sports terminal deployed in the local electronic sports region $Q_1$, and the RRU may also be configured to communicate with the 5G extension unit 11K. For the 5G extension unit 11K, the 5G extension unit 11K may be configured to communicate with each RRU in the $E_1$ RRUs, and the 5G extension unit 11K may also be configured to communicate with the BBU 11B with data distribution function.

The electronic sports service corresponding to the local electronic sports region $Q_2$ may be referred to as a second electronic sports service. As shown in FIG. 1, the local electronic sports region $Q_2$ may include a second electronic sports terminal cluster, a base station 12J, a local electronic sports server 12F corresponding to the second electronic sports service. A quantity of electronic sports terminals in the local electronic sports region $Q_2$ may be $M_2$, where $M_2$ is a positive integer. The $M_2$ electronic sports terminals may include a plurality of electronic sports clusters belonging to different electronic sports camps. For example, the $M_2$ electronic sports terminals includes an electronic sports cluster $12Y_1$, an electronic sports cluster $12Y_2$, and an electronic sports cluster $12Y_3$ as shown in FIG. 1. The electronic sports cluster $12Y_1$, the electronic sports cluster $12Y_2$, and the electronic sports cluster $12Y_3$ all belong to different electronic sports camps.

The base station 12J in the local electronic sports region $Q_2$ includes $E_2$ 5G remote radio units, a 5G extension unit 12K, and a building base band unit 12B, where $E_2$ is a positive integer. The $E_2$ RRUs may include an RRU $12R_1$, an RRU $12R_2$, and an RRU $12R_3$ as shown in FIG. 1. As shown in FIG. 1, for each of the $E_2$ RRUs, the RRU may be configured to communicate with the electronic sports terminal deployed in the local electronic sports region $Q_2$, and the RRU may also be configured to communicate with the 5G extension unit 12K. For the 5G extension unit 12K, the 5G extension unit 12K may be configured to communicate with each RRU in the $E_2$ RRUs, and the 5G extension unit 12K may also be configured to communicate with the BBU 12B with data distribution function.

The network connection relationship between the base station in each local electronic sports region and the 5G core network 10W may be referred to as a first network connection relationship. As shown in FIG. 1, the building base band unit 11B in the base station 11J of the local electronic sports region $Q_1$ and the 5G core network 10W have the first network connection relationship, and the building base band unit 12B in the base station 12J of the local electronic sports region $Q_2$ and the 5G core network 10W also have the first network connection relationship. The network connection relationship between the base station in each local electronic sports region and the local electronic sports server in the local electronic sports region may be referred to as a second network connection relationship. As shown in FIG. 1, the building base band unit 11B in the base station 11J of the local electronic sports region $Q_1$ and the local electronic sports server 11F in the local electronic sports region $Q_1$ may have a second network connection relationship, and the building base band unit 12B in the base station 12J of the local electronic sports region $Q_2$ and the local electronic sports server 12F in the local electronic sports region $Q_2$ may have a second network connection relationship. Network connections corresponding to the first network connection relationship and the second network connection relationship here may be direct or indirect connections through wired communication or wireless communication.

The local electronic sports server in each local electronic sports region of the 5G private network, such as the local electronic sports server 11F or the local electronic sports server 12F, may be a server corresponding to an electronic sports client associated with the local electronic sports region. The local electronic sports server may be an independent physical server, or a server cluster or distributed system including a plurality of physical servers, or a cloud server providing cloud computing services. This embodiment of this application does not limit a quantity of the local electronic sports server in each local electronic sports region.

Any of the N local electronic sports regions may be referred to as a target local electronic sports region (for example, local electronic sports region $Q_1$), then the base station (for example, base station 11J) in the target local electronic sports region may be referred to as a target base station, and the local electronic sports server (for example, local electronic sports server 11F) in the target local electronic sports region may be referred to as a target local electronic sports server. Each electronic sports terminal in the target local electronic sports region may be equipped with a target application (namely, an electronic sports client). The electronic sports client, when running in each electronic sports terminal, may exchange data with the target local electronic sports server in the target local electronic sports region.

Figure 2:
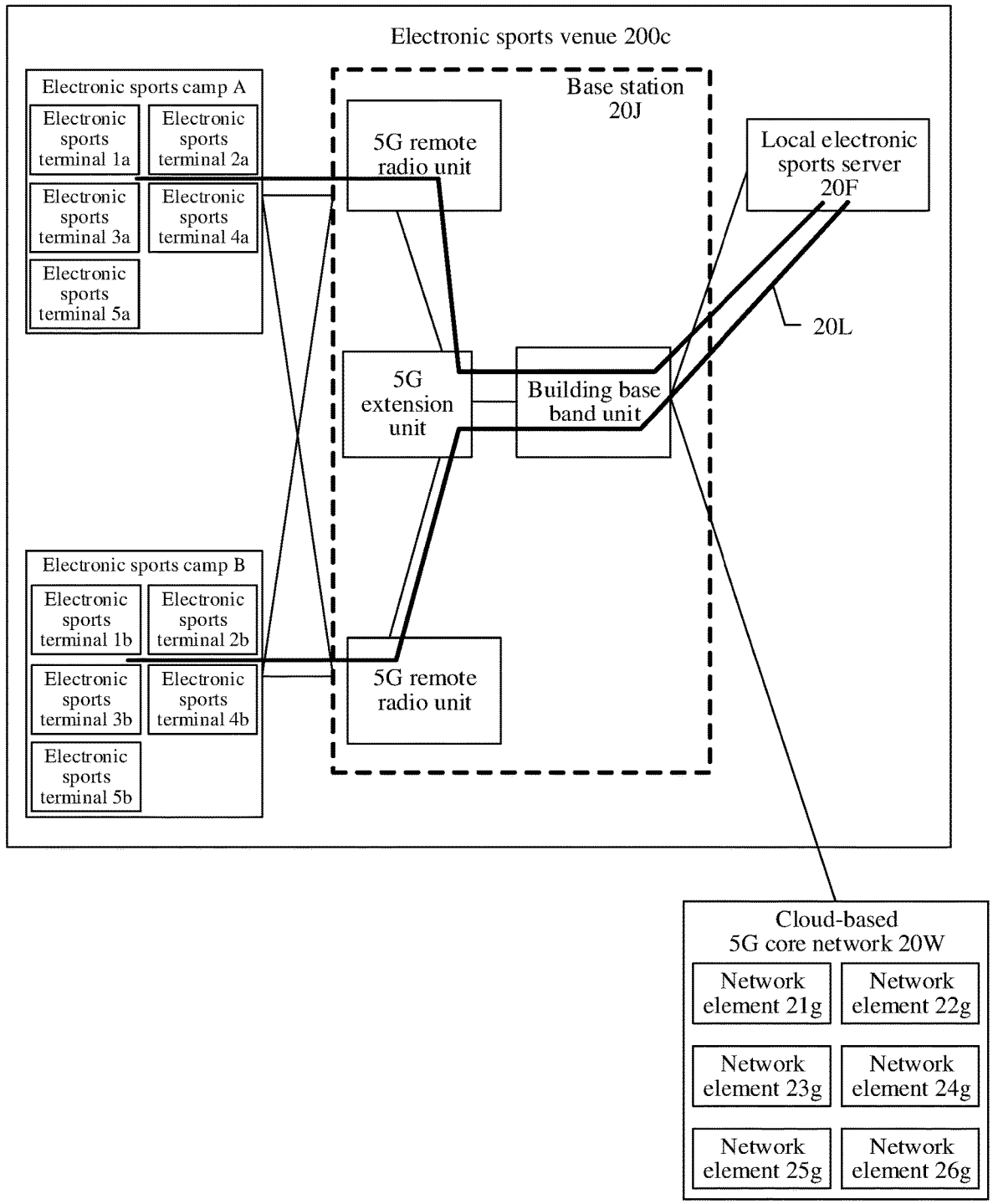
FIG. 2 is a schematic diagram showing a scenario for data interaction according to an embodiment of this application.

FIG. 2 is a schematic diagram showing a scenario for data interaction according to an embodiment of this application. A 5G private network base station distribution program may be deployed in the plurality of local electronic sports regions. Any local electronic sports region (namely, the target local electronic sports region) among the plurality of local electronic sports regions is used as an example in this embodiment of this application. As shown in FIG. 2, the target local electronic sports region may be an electronic sports venue 200c shown in FIG. 2. The 5G private network base station distribution program may rent a frequency band of an operator or use a frequency band of a private network to build a complete network and program in the electronic sports venue 200c, to completely separate from data and traffic of a public network, so as to ensure independence of the network. As shown in FIG. 2, a base station 20J (namely, a target base station), electronic sports terminals running electronic sports clients, and a local electronic sports server 20F (namely, a target local electronic sports server) in a 5G private network may all be deployed in a local electronic sports region, namely an electronic sports venue 200c, and a 5G core network 20W in the 5G private network may be deployed in a cloud and may serve a plurality of other electronic sports venues including the electronic sports venue 200c. The electronic sports venue 200c may be the local electronic sports region $Q_1$ shown in FIG. 1 above. The 5G core network 20W may be the 5G core network 10W shown in FIG. 1 above.

The base station 20J in the electronic sports venue 200c includes 5G remote radio units, a 5G extension unit, and a building base band unit shown in FIG. 2. A quantity of the 5G remote radio units in the base station 20J may be at least one, for example, 2. As shown in FIG. 2, the 5G extension unit may be configured to communicate with the 5G remote radio units in the base station 20J, and the 5G extension unit may also be configured to communicate with the building base band unit in the base station 20J.

The electronic sports venue 200c shown in FIG. 2 may include a plurality of electronic sports terminals belonging to different electronic sports camps. For example, the electronic sports venue 200c may include electronic sports terminals belonging to an electronic sports camp A and electronic sports terminals belonging to an electronic sports camp B. The electronic sports camp A shown in FIG. 2 and the electronic sports camp B shown in FIG. 2 may be two different electronic sports camps competing in an electronic sports client. A quantity of the electronic sports terminals in the electronic sports camp A may be at least one, for example, 5. The 5 electronic sports terminals may include an electronic sports terminal 1a, an electronic sports terminal 2a, an electronic sports terminal 3a, an electronic sports terminal 4a, and an electronic sports terminal 5a. A quantity of the electronic sports terminals in the electronic sports camp B may also be at least one, for example, 5. The 5 electronic sports terminals may include an electronic sports terminal 1b, an electronic sports terminal 2b, an electronic sports terminal 3b, an electronic sports terminal 4b, and an electronic sports terminal 5b. The quantity of the electronic sports terminals in the electronic sports camp A may be the same or different from the quantity of the electronic sports terminals in the electronic sports camp B. An electronic sports card used by an electronic sports user corresponding to each electronic sports terminal is obtained by the 5G core network 20W shown in FIG. 2 based on a card activation request after activating and activating a to-be-activated electronic sports card. The card activation request here is sent by a management terminal in the 5G private network.

The cloud-based 5G core network 20W may include at least one network element. For example, the 5G core network 20W may include a network element 21g, a network element 22g, a network element 23g, a network element 24g, a network element 25g, and a network element 26g. The network element 21g shown in FIG. 2 may be an access and mobility management function (AMF) network element; the network element 22g may be a session management function (SMF) network element; the network element 23g may be a unified data management (UDM) network element; the network element 24g may be an authentication server function (AUSF) network element; the network element 25g may be a user plane function (UPF) network element; and the network element 26g may be a policy control function (PCF) network element.

Because the plurality of local electronic sports regions in the 5G private network share a set of cloud-based 5G core network 20W, an account system, card activation, and account activation are all performed in the cloud, so that the plurality of local electronic sports regions can share a set of electronic sports cards. However, the sharing of the set of electronic sports cards will reduce the independence of executing the electronic sports service in the local electronic sports region. In order to effectively ensure that the information of each electronic sports venue is not disordered (namely, the electronic sports account corresponding to the same electronic sports card cannot appear in a plurality of local electronic sports regions at the same time), a terminal access condition is used for indicating that the management terminal in the 5G private network, when detecting the presence of electronic sports terminals that activate electronic sports clients in the N local electronic sports regions, verifies permissions of the detected electronic sports terminals through the first network connection relationship between the base stations in the 5G private network and the 5G core network 20W. This means that the management terminal in the 5G private network may determine, through the terminal access condition and the 5G core network 20W, whether the card information of the electronic sports card used by the electronic sports terminal that currently starts the electronic sports client is consistent with the electronic sports cards used by the electronic sports terminals that are executing electronic sports services in the 5G private network.

If the electronic sports card used by the electronic sports terminal that currently starts the electronic sports client is different from the electronic sports cards used by all the electronic sports terminals that are executing electronic sports services in the 5G private network, it may be determined that the electronic sports terminal that currently starts the electronic sports client satisfies the terminal access condition. If the electronic sports card used by the electronic sports terminal that currently starts the electronic sports client is consistent with the electronic sports card used by one electronic sports terminal that is executing an electronic sports service in the 5G private network, it may be determined that the electronic sports terminal that currently starts the electronic sports client does not satisfy the terminal access condition.

A line 20L shown in FIG. 2 may be a data transmission process when any electronic sports terminal satisfying the terminal access condition in the electronic sports camp A or the electronic sports camp B executes an electronic sports service. The electronic sports terminal shown in FIG. 2, such as electronic sports terminal 1a, may run the electronic sports client to execute the electronic sports service corresponding to the electronic sports client when satisfying the terminal access condition, and may then generate electronic sports service data carrying access identification information. The access identification information may be used for instructing the base station 20J to search in service routing information associated with the building base band unit. The electronic sports terminal 1a may send the electronic sports service data carrying access identification information to the base station 20J, the base station 20J may forward the electronic sports service data carrying access identification information to the 5G extension unit through the 5G remote radio unit, and then the 5G extension unit, when receiving the electronic sports service data carrying access identification information, may forward the electronic sports service data carrying access identification information to the building base band unit.

The management user corresponding to the management terminal may log in to a local base station network management platform (namely, the second network management platform) in advance in a network management system of the 5G private network, such as the network management system in FIG. 1, and may then perform distribution configuration for the base station in each local electronic sports region to obtain setting information (namely, second setting information). The second setting information may include service routing information associated with the building base band unit in the base station 20J. On this basis, when obtaining the electronic sports service data carrying access identification information, the base station 20J needs to obtain the service routing information associated with the building base band unit of the base station 20J, and then searches for the service routing information same as the access identification information in the service routing information.

When finding the service routing information same as the access identification information, the base station 20J may directly send the electronic sports service data to the local electronic sports server 20F corresponding to the access identification information based on the second network connection relationship between the building base band unit and the local electronic sports server 20F. At this point, the local electronic sports server 20F may obtain electronic sports response data of the electronic sports service based on the received electronic sports service data, and then return the electronic sports response data to the electronic sports terminal 1a through the base station 20J, so that the electronic sports terminal 1a outputs image frames corresponding to the electronic sports response data. Meanwhile, the local electronic sports server 20F may also return the electronic sports response data, through the base station 20J, to other electronic sports terminals participating in the local electronic sports service before the electronic sports terminal 1a as shown in FIG. 2, so that other electronic sports terminals may output image frames corresponding to the electronic sports response data.

From this, it may be seen that the base stations deployed in the plurality of local electronic sports regions of the 5G private network all have a first network connection relationship with the 5G core network 20W deployed in the cloud. This means that the 5G core network 20W deployed in the cloud may serve the plurality of local electronic sports regions. Therefore, when the electronic sports terminal in any of the plurality of local electronic sports regions (namely, the electronic sports venue 200c shown in FIG. 2) satisfies the terminal access condition, the electronic sports service corresponding to the local electronic sports region where the electronic sports terminal is located may be executed. For example, the base station 20J shown in FIG. 2 can obtain the electronic sports service data carrying access identification information sent by the electronic sports terminal 1a that satisfies the terminal access condition, and then search for, through the data distribution function of the building base band unit in the base station 20J, the service routing information same as the access identification information in the service routing information associated with the building base band unit. When finding the service routing information same as the access identification information, the base station 20J may quickly send the electronic sports service data to the local electronic sports server 20F, so that the local electronic sports server 20F determines electronic sports response data corresponding to the electronic sports service, thereby achieving data interaction between the electronic sports terminal and the local electronic sports server 20F, rather than deploying a 5G core network in each local electronic sports region. On this basis, when a large number of local electronic sports regions need to be deployed in the 5G private network, deployment costs can be reduced.

The 5G core network deployed in the cloud may serve the plurality of local electronic sports regions deployed in the 5G private network, so as to achieve data interaction between the electronic sports terminal satisfying the terminal access condition in each local electronic sports region and the corresponding local electronic sports server. For example, a specific implementation for data interaction between the electronic sports terminal satisfying the terminal access condition in any local electronic sports region (namely, a target local electronic sports region) and a target local electronic sports server in the 5G private network may refer to corresponding embodiments in FIG. 3 to FIG. 7 below.

Figure 3:
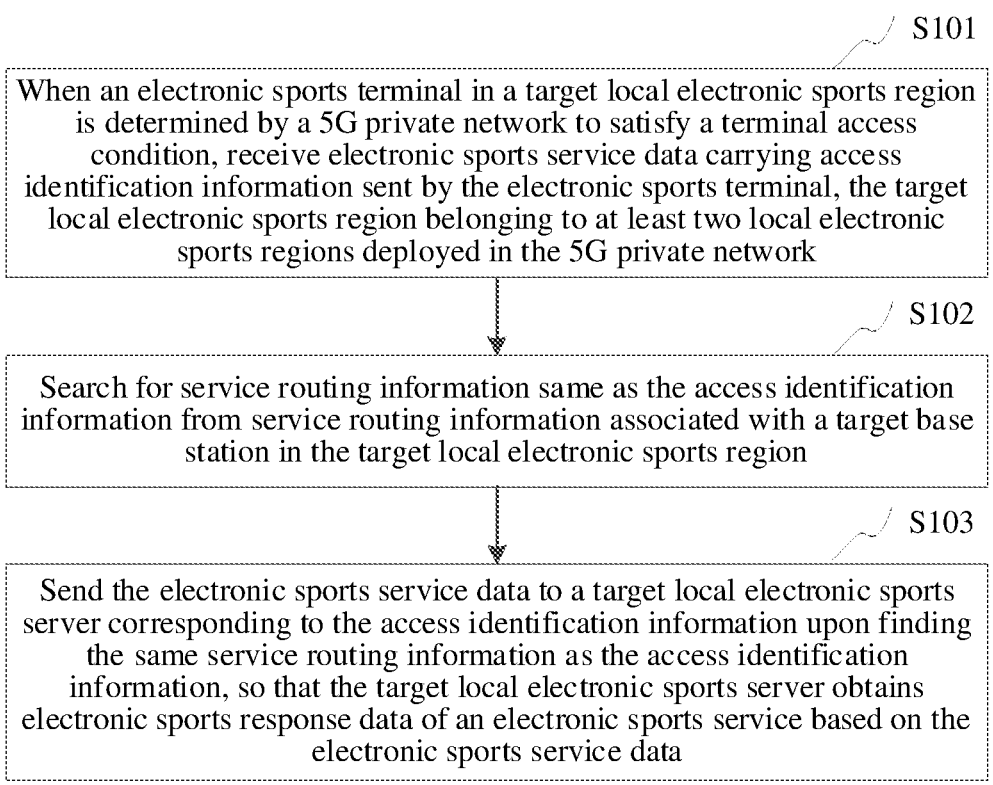
FIG. 3 is a schematic flowchart of an electronic sports data processing method according to an embodiment of this application.

In some embodiments, as shown in FIG. 3, an electronic sports data processing method is provided. This method may be performed by a target base station in a target local electronic sports region. The target local electronic sports region may be any of N local electronic sports regions deployed in a 5G private network, where N is a positive integer. The target base station may include target 5G remote radio units with data reception function, a target 5G extension unit with data integration function, and a target building base band unit with data distribution function. The target base station may be the base station 11J in the local electronic sports region Q1 shown in FIG. 1 above. This method includes:

Step S101. When an electronic sports terminal in a target local electronic sports region is determined by a 5G private network to satisfy a terminal access condition, receive electronic sports service data carrying access identification information sent by the electronic sports terminal, the target local electronic sports region belonging to at least two local electronic sports regions deployed in the 5G private network (i.e., the target local electronic sports region is one of the at least two local electronic sports regions).

The 5G private network may include a 5G core network deployed in a cloud. The at least two local electronic sports regions deployed in the 5G private network are, for example, N local electronic sports regions deployed in the 5G private network. A base station in each of the N local electronic sports regions deployed in the 5G private network has a first network connection relationship with the 5G core network deployed in the cloud. This means that the 5G core network deployed in the cloud may serve N local electronic sports regions without deploying the 5G core network in each local electronic sports region, resulting in reduced deployment costs and strong maintainability and scalability. Each of the N local electronic sports regions may be deployed with a base station, electronic sports terminals running electronic sports clients (such as game clients), and a local electronic sports server corresponding to the electronic sports clients. For the convenience of explanation, the electronic sports terminal satisfying the terminal access condition in the target local electronic sports region may be referred to as a target electronic sports terminal in this embodiment of this application. Specifically, when the target electronic sports terminal executes an electronic sports service, the target electronic sports terminal may send the electronic sports service data carrying access identification information to the target base station in the target local electronic sports region. At this point, the target base station may receive, through the target 5G remote radio unit, the electronic sports service data carrying access identification information that are sent by the electronic sports client through the target electronic sports terminal, and forward the electronic sports service data carrying access identification information to the target 5G extension unit. Then, the target 5G extension unit may forward the electronic sports service data carrying access identification information to the target building base band unit.

A quantity of electronic sports terminals in the target local electronic sports region may be M, where M is a positive integer. The M electronic sports terminals may include a plurality of electronic sports terminals belonging to different electronic sports camps. For example, the quantity of electronic sports terminals in the target local electronic sports region (for example, the local electronic sports region $Q_1$ in FIG. 1) may be 50. The 50 electronic sports terminals may include 2 electronic sports camps having a competitive relationship, including an electronic sports camp corresponding to an electronic sports cluster $11Y_1$ (namely, a first electronic sports camp) and an electronic sports camp corresponding to an electronic sports cluster $11Y_2$ (namely, a second electronic sports camp). Electronic sports terminals in each of the 2 electronic sports camps may execute the electronic sports service associated with the target local electronic sports region. The quantity of electronic sports terminals in each electronic sports camp here may be the same or different, which is not limited here. In this embodiment of this application, the electronic sports terminals in the first electronic sports camp may be referred to as first electronic sports terminals, the electronic sports terminals in the second electronic sports camp may be referred to as second electronic sports terminals, and the first electronic sports camp and the second electronic sports camp belong to different electronic sports camps.

The target base station may include E target 5G remote radio units with data reception function, one target 5G extension unit with data integration function, and one building base band unit with data distribution function. In this embodiment of this application, the quantity of target 5G remote radio units may be properly deployed according to the occupied area of the target local electronic sports region, so that the target base station can cover a large area in the target local electronic sports region. For example, the target base station may include 5 target 5G remote radio units, and each of the 5 target 5G remote radio units may be configured to receive service data information. The target 5G remote radio unit configured to receive the service data information is determined based on parameters such as network status, location distance from a data sending end (for example, an electronic sports terminal or a management terminal), capacity, and idle duty cycle of each of the E target 5G remote radio units.

The service data information here may include first service data information and second service data information. The first service data information may be sent by the management terminal in the 5G private network. For example, the first service data information may include first setting information, second setting information, a card activation request, a permission verification request, and notification information sent by the management terminal. The first setting information here may be determined by a management user corresponding to the management terminal in the 5G private network on a first network management platform (for example, a 5G core network management platform) after setting network elements deployed in the 5G core network of the cloud. The second setting information here may be determined by the management user on a second network management platform (for example, a local base station network management platform) after distribution configuration on the base station in each of the N local electronic sports regions deployed in the 5G private network. The second service data information may be sent by the electronic sports terminal satisfying the terminal access condition in the target local electronic sports region. For example, the second service data information may include electronic sports service data carrying access identification information that are generated when the electronic sports terminal satisfying the terminal access condition executes the electronic sports service.

Figure 4:
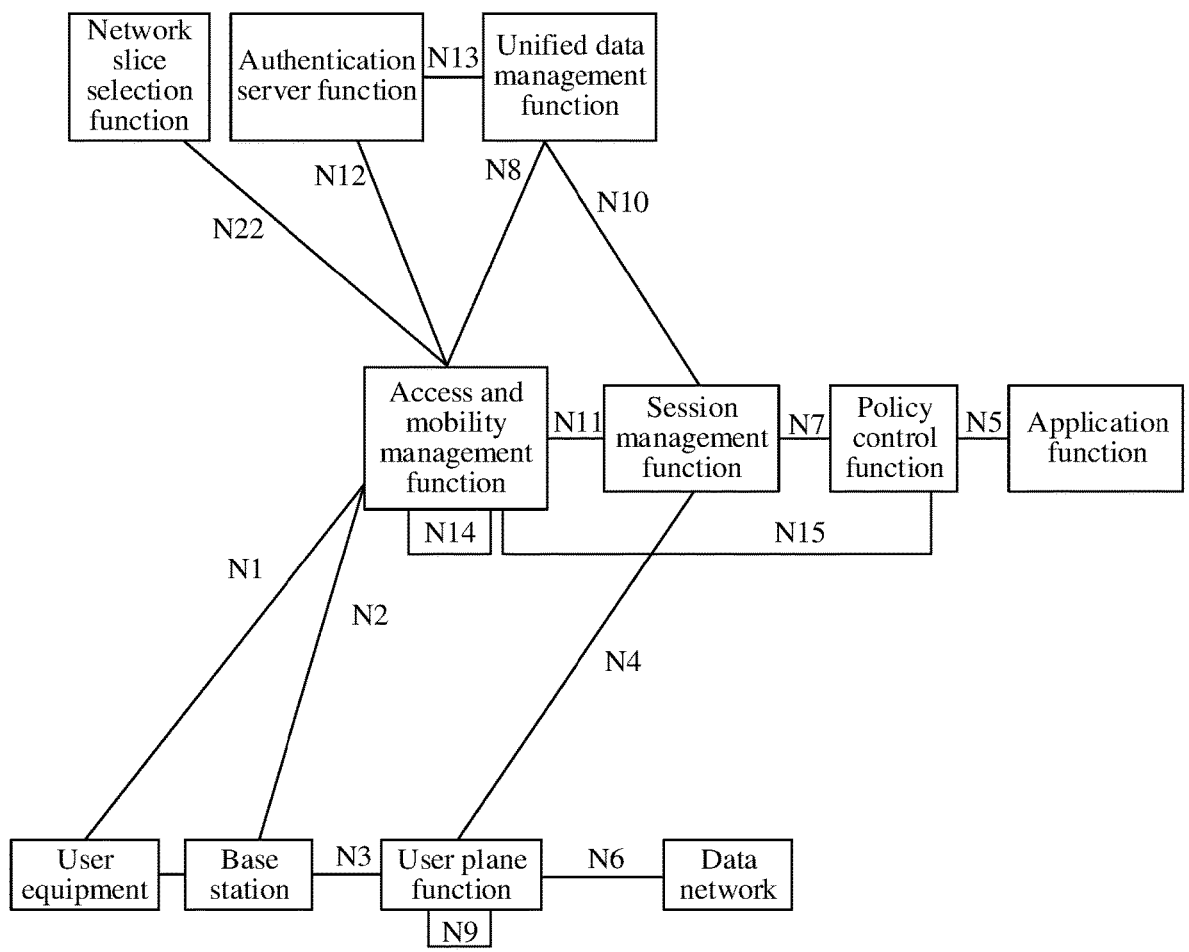
FIG. 4 is a schematic diagram showing a network architecture based on a 5G communication system according to an embodiment of this application.

For the convenience of understanding, refer to FIG. 4. FIG. 4 is a schematic diagram showing a network architecture based on a 5G communication system according to an embodiment of this application. The network architecture is implemented on the network architecture shown in FIG. 1 above. As shown in FIG. 4, the 5G communication system may include at least a 5G access network, a 5G core network deployed in a cloud, and user equipment.

The user equipment (UE) shown in FIG. 4 may include a target electronic sports client (namely, an electronic sports terminal satisfying the terminal access condition) deployed in the target local electronic sports region (namely, any of the N local electronic sports regions deployed in the 5G private network), or a management terminal configured to manage the 5G private network corresponding to the 5G communication system. Before service communication in the 5G private network, the user equipment may obtain an IP address configured by the 5G core network in the cloud. For example, when sending electronic sports service data, the target electronic sports terminal (namely, the electronic sports terminal satisfying the terminal access condition) in the target local electronic sports region may obtain the IP address configured for the target electronic sports terminal by the SMF (session management function) network element deployed in the 5G core network of the cloud, and then access a data network (DN) shown in FIG. 4 according to the IP address, for example, an operator service, or an Internet access or third-party service.

The base station shown in FIG. 4 may be a target base station in a target local electronic sports region. The target base station may include E target 5G remote radio units, one target 5G extension unit for data integration, and one target building base band unit for data distribution. The target base station has an access network ((radio) access network, abbreviated as (R)AN) function, that is, may be configured to connect the user equipment shown in FIG. 4 to the 5G core network deployed in the cloud.

The user plane function network element (UPF network element) shown in FIG. 4 may include the following functions: IP address management, policy implementation, traffic reporting, QoS processing, and control of user plane forwarding for the user equipment. Routing and forwarding of data from the base station shown in FIG. 4 to a data network are the main function of the UPF network element, and the UPF network element is a unique data processing module deployed in the 5G core network of the cloud. The 5G core network deployed in the cloud may completely separate a control plane from a user plane, that is, a user plane module is configured to process data and a control plane module is configured for network management.

The access and mobility management function network element (AMF network element) shown in FIG. 4 is a module mainly configured to control access of the user equipment to a network, authenticate identity of the user equipment, and enable the user equipment to move around the target local electronic sports region to maintain connectivity, and is a central processing unit (CPU) deployed in the 5G core network of the cloud, similar to the human brain. For example, before the electronic sports terminal in the 5G private network executes the electronic sports service, the electronic sports client needs to be started. Then, when the electronic sports client is started, the permission of the electronic sports terminal of the started electronic sports client may be verified through the AMF network element in the 5G core network of the cloud and the terminal access condition, to determine whether the electronic sports terminal of the started electronic sports client has an access permission, thereby effectively avoiding information confusion with other electronic sports venues, that is, effectively avoiding appearance of the electronic sports account corresponding to the same electronic sports card in different local electronic sports regions within the same time.

The session management function network element (SMF network element) shown in FIG. 4 may be connected to the UPF network element deployed in the 5G core network of the cloud through an N4 interface, and is mainly configured to assign access identification information (for example, IP address) to the user equipment, and to manage each channel between the user equipment and the 5G core network deployed in the cloud.

The policy control function network element (PCF network element) shown in FIG. 4 may indicate that a unified policy framework provides policy rules for controlling plane functions. The PCF network element may include non-session management related policy control and session management related policy control. The non-session management related policy control may include access and mobility related policy control. For example, the PCF network element may be configured to provide access and mobility management related policies for the AMF network element. The session management related policy control may include application detection and control requirements, for example, detect traffic of a specified application, and report start or stop of application traffic to the PCF network element. The application here may be an application corresponding to the application function (AF) shown in FIG. 4, for example, the application may be an electronic sports client configured to execute an electronic sports service.

The network slice selection function (NSSF) network element shown in FIG. 4 may determine a network slice instance that UE is allowed to access according to slice selection auxiliary information, signing information, and the like of the UE. The authentication server function network element (AUSF network element) shown in FIG. 4 may implement access authentication of 3GPP and non-3GPP. The unified data management network element (UDM network element) shown in FIG. 4 may be configured for data management such as user identification, access authorization, registration, movement, subscription, short message management, and the like. For example, the UDM network element may be configured to store received service data information. The service data information here may include first service data information sent by the management terminal and second service data information sent by the electronic sports terminal satisfying the terminal access condition in the target local electronic sports region.

Before any electronic sports terminal in the N local electronic sports regions deployed in the 5G private network executes the electronic sports service, the electronic sports user needs to perform a start operation on the electronic sports client corresponding to the electronic sports terminal to start the electronic sports client. The management terminal in the 5G private network has a terminal detection function. The management terminal may detect the electronic sports terminal that is starting the electronic sports client in the N local electronic sports regions, and then the detected electronic sports terminal may be referred to as a to-be-verified electronic sports terminal (also referred to as a "candidate electronic sports terminal"). Further, the management terminal may obtain card information (such as electronic sports account, user information of the electronic sports user, and card activation timestamp) of an electronic sports card used by the to-be-verified electronic sports terminal. The obtained card information is referred to as to-be-verified card information or candidate card information. Then a permission verification request may be generated based on the to-be-verified card information.

The management terminal may directly obtain, from stored card information of the electronic sports card used by each electronic sports terminal, the card information of the electronic sports card used by the to-be-verified electronic sports terminal. Optionally, the management terminal may alternatively obtain, according to the base station in the 5G private network, the card information of the electronic sports card used by the to-be-verified electronic sports terminal from the 5G core network deployed in the cloud.

In this case, the management terminal may determine, from the base stations in the 5G private network, a base station having an optimal network connection relationship with the management terminal. For example, the management terminal may obtain a current corresponding connection parameter of each base station in the 5G private network, select the base station with the maximum connection parameter from the obtained connection parameters, and use the selected base station as the base station having the optimal network connection relationship with the management terminal. The connection parameter here may be determined according to parameters, such as network status, location distance from the management terminal, capacity, and idle duty cycle of each base station.

For example, a plurality of base stations may be deployed in the 5G private network. The plurality of base stations may include base stations 1J, 2J, 3J, and 4J. The management terminal may obtain the current corresponding connection parameter of each base station according to the parameters, such as current network status and location distance from the management terminal, of each base station among the 4 base stations. For example, the connection parameter of the base station 1J is 10, the connection parameter of the base station 2J is 20, the connection parameter of the base station 3J is 80, and the connection parameter of the base station 4J is 60. In this case, the management terminal may determine the base station 3J with the connection parameter of 80 as the base station having the optimal network connection relationship with the management terminal.

When the base station having the optimal network connection relationship with the management terminal, determined by the management terminal, is the target base station in the target local electronic sports region, the management terminal may send the permission verification request to the target base station based on the optimal network connection relationship, and then forward the permission verification request to the 5G core network deployed in the cloud through the first network connection relationship between the target base station and the 5G core network deployed in the cloud, so that the 5G core network deployed in the cloud obtains, based on the to-be-verified card information in the permission verification request, status information of the to-be-verified card information used by the to-be-verified electronic sports terminal.

In this embodiment of this application, the AMF network element deployed in the 5G core network of the cloud may be referred to as a first function network element, the SMF network element may be referred to as a second function network element, and the UDM network element may be referred to as a third function network element. It may be understood that, when the electronic sports terminal in the target local electronic sports region satisfies the terminal access condition, the electronic sports terminal satisfying the terminal access condition (namely, the target electronic sports terminal) may execute the electronic sports service to generate electronic sports service data corresponding to the electronic sports service. Further, the target electronic sports terminal may obtain the IP address configured for the target electronic sports terminal by the SMF network element deployed in the 5G core network of the cloud, use the IP address as access identification information, and then obtain the electronic sports service data carrying the access identification information based on the access identification information and the electronic sports service data.

Further, the target base station in the target local electronic sports region may obtain second setting information determined by the management user (namely, setting information determined after distribution configuration for the base station in each of the N local electronic sports regions on the second network management platform), obtain setting information associated with the target 5G remote radio unit in the target base station from the second setting information, and then match the obtained setting information with terminal information carried by the target electronic sports terminal to determine whether the target 5G remote radio unit in the target base station may access the target electronic sports terminal, for example, whether parameter information such as spectrum, bandwidth, and signal-to-noise ratio in the terminal information carried by the target electronic sports terminal matches the obtained setting information.

As shown in FIG. 2, because the 5G remote radio unit (namely, the target 5G remote radio unit) in the base station 20J is configured to communicate with electronic sports terminals in the electronic sports venue 200c, when it is determined that the 5G remote radio unit in the base station 20J can access the electronic sports terminal satisfying the terminal access condition (namely, the target electronic sports terminal, for example, electronic sports terminal 1a), the target base station may receive, through the target 5G remote radio unit, the electronic sports service data carrying access identification information sent by the target electronic sports terminal, and forward the electronic sports service data carrying access identification information to the 5G extension unit (namely, the target 5G extension unit) in the base station 20J, and then the target 5G extension unit may send the electronic sports service data carrying access identification information to the building base band unit (namely, the target building base band unit) in the base station 20J. The target 5G extension unit in the target base station can extend more target 5G remote radio units to cover a larger area, that is, the target 5G extension unit may receive service data information sent by a plurality of target 5G remote radio units communicating with the target 5G extension unit, and may then integrate a plurality of pieces of received service data information.

Step S102. Search for service routing information same as the access identification information from service routing information associated with a target base station in the target local electronic sports region (i.e., searching in the service routing information associated with the target base station for the service routing information same as the access identification information). In this disclosure, the service routing information same as the access identification information is also referred to as "target service routing information."

Specifically, the target base station may obtain second setting information obtained by a management user corresponding to a management terminal on a second network management platform (for example, a local base station network management platform) after distribution configuration on a base station in each of the N local electronic sports regions. Further, the target base station may determine the service routing information of a target building base band unit in the target base station from the second setting information, and search for the service routing information same as the access identification information from the service routing information.

The service routing information associated with the target building base band unit obtained by the target base station from the second setting information may be a service routing information table shown in Table 1 below. Further, refer to Table 1. Table 1 is a service routing information table associated with the target building base band unit according to an embodiment of this application.

TABLE 1

| Target local electronic sports server | Service routing information |
|---|---|
| Electronic sports server 1 | Service routing information 1 |
| Electronic sports server 2 | Service routing information 2 |
| ... | ... |
| Electronic sports server m | Service routing information m |

As shown in Table 1, the service routing information corresponding to each target local electronic sports server in the service routing information table may be information used for identifying the target local electronic sports server. For example, the service routing information may be an IP (Internet Protocol) address. The electronic sports server 1, the electronic sports server 2 ..., and the electronic sports server m in Table 1 may all be target local electronic sports servers deployed in the target local electronic sports region. The electronic sports service corresponding to each of the m target local electronic sports servers may be different. For example, the electronic sports service corresponding to the electronic sports server 1 may be an electronic sports service associated with an electronic sports client 1 (for example, a shooting game client); the electronic sports service corresponding to the electronic sports server 2 may be an electronic sports service associated with an electronic sports client 2 (for example, a racing game client); and the electronic sports service corresponding to the electronic sports server m may be an electronic sports service associated with an electronic sports client m (for example, a policy game client).

As shown in FIG. 2, when the base station 20J in the electronic sports venue 200c obtains electronic sports service data carrying access identification information (for example, 117.114.151.174) sent by the electronic sports terminal 1a, the base station 20J may obtain the service routing information table shown in Table 1 above. Further, the base station 20J may traverse and search for the service routing information same as the access identification information in the foregoing service routing information table.

Step S103. Send the electronic sports service data to a target local electronic sports server corresponding to the access identification information upon finding the service routing information same as the access identification information, so that the target local electronic sports server obtains electronic sports response data of an electronic sports service based on the electronic sports service data.

Specifically, upon finding the service routing information same as the access identification information, the target base station may directly send the electronic sports service data to the target local electronic sports server corresponding to the access identification information based on the second network connection relationship between the target base station and the target local electronic sports server in the target local electronic sports region. The second network connection relationship here refers to a network connection relationship between the target building base band unit in the target base station and the target local electronic sports server corresponding to the electronic sports service. In this case, the target local electronic sports server may obtain the electronic sports response data of the electronic sports service based on the electronic sports service data.

In the electronic sports data processing method provided in this application, the base stations in the N local electronic sports regions deployed in the 5G private network all have the first network connection relationship with the 5G core network deployed in the cloud. Therefore, the electronic sports terminal in any of the N local electronic sports regions (namely, the target local electronic sports region) may execute the electronic sports service corresponding to the target local electronic sports region when satisfying the terminal access condition, to generate electronic sports service data carrying access identification information. Further, when receiving the electronic sports service data carrying access identification information, the target base station in the target local electronic sports region may search for the service routing information same as the access identification information from the service routing information associated with the target base station, and then send the electronic sports service data to the target local electronic sports server corresponding to the service access identification information through the second network connection relationship between the target base station and the target local electronic sports server in the target local electronic sports region upon finding the service routing information same as the access identification information. The 5G private network in this embodiment of this application does not need to deploy the 5G core network separately in each local electronic sports region. This may significantly reduce deployment costs in a case of excessive local electronic sports regions.

In some embodiments, the target base station includes a target 5G remote radio unit, a target 5G extension unit, and a target building base band unit; the 5G private network includes a management terminal and a 5G core network deployed in the cloud; and the method further includes: receiving first setting information sent by the management terminal and forwarding the first setting information to the target 5G extension unit through the target 5G remote radio unit, the first setting information being determined based on network elements in the 5G core network; forwarding the first setting information to the target building base band unit through the target 5G extension unit; and forwarding the first setting information to the 5G core network through the target building base band unit, so that the 5G core network stores the first setting information.

The target building base band unit is configured to communicate with the target 5G extension unit and communicate with the 5G core network deployed in the cloud; and the target base station is a base station having an optimal network connection relationship with the management terminal, which is determined from the base stations deployed in the 5G private network. The first setting information is determined by the management user corresponding to the management terminal on the first network management platform for the network element deployed in the 5G core network of the cloud.

The first setting information may include at least one kind of parameter information set by the management user and having an access permission, such as card information, signal strength, spectrum, bandwidth, and signal-to-noise ratio. The network connection relationship between the base station in each local electronic sports region and the 5G core network 10W may be referred to as a first network connection relationship. As shown in FIG. 1, the building base band unit 11B in the base station 11J of the local electronic sports region Q1 and the 5G core network 10W have the first network connection relationship, and the building base band unit 12B in the base station 12J of the local electronic sports region Q2 and the 5G core network 10W also have the first network connection relationship.

In this embodiment, the first setting information, namely, card information with access permissions, is stored in the 5G core network, so that the 5G core network in the cloud manages the card information with access permissions, the 5G core network does not need to be deployed in each local electronic sports region, and deployment costs of the 5G core network are reduced accordingly.

In some embodiments, the 5G core network includes a first function network element, a second function network element, and a third function network element; the first function network element is configured to implement access and mobility management functions; the second function network element is configured to implement a session management function; and the third function network element is configured to implement unified data management. The forwarding the first setting information to the 5G core network deployed in the cloud through the target building base band unit includes: forwarding the first setting information to the first function network element through the target building base band unit, so that the first function network element forwards the first setting information to the second function network element, where the second function network element is configured to store the first setting information to the third function network element.

For example, the first function network element is an AMF network element deployed in the 5G core network of the cloud, the second function network element is an SMF network element, and the third function network element is a UDM network element.

Figure 5:
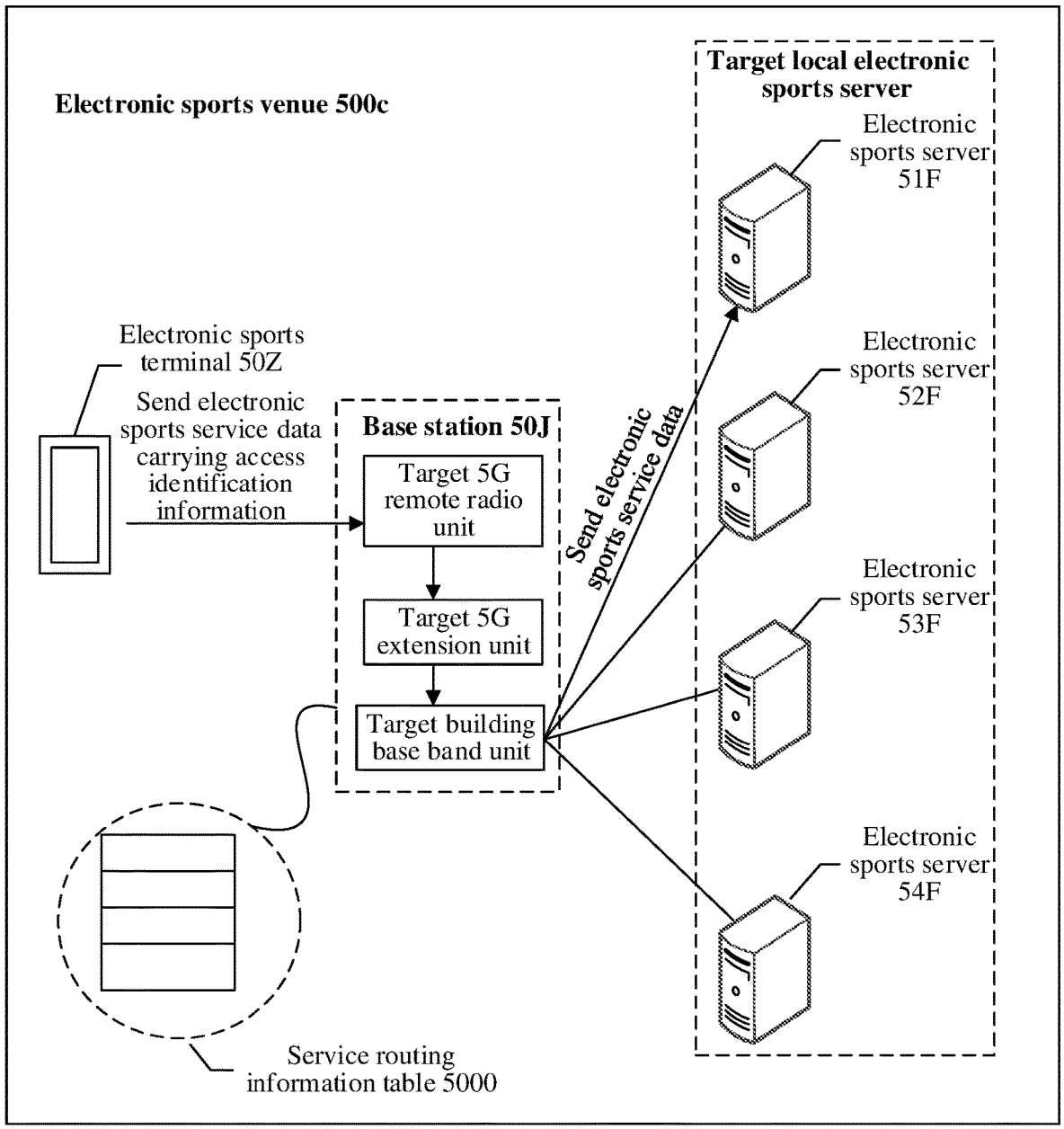
FIG. 5 is a schematic diagram showing a scenario for sending electronic sports service data according to an embodiment of this application.

In this embodiment, the first setting information is stored in the 5G core network by using the first function network element, the second function network element, and the third function network element deployed in the 5G core network of the cloud, thereby improving storage efficiency. For the convenience of understanding, further, refer to FIG. 5. FIG. 5 is a schematic diagram showing a scenario for sending electronic sports service data according to an embodiment of this application. As shown in FIG. 5, an electronic sports venue 500*c* (namely, a target local electronic sports region) in this embodiment of this application may be any of N local electronic sports regions deployed in a 5G private network in this embodiment of this application. The electronic sports venue 500*c* may be deployed with an electronic sports terminal 50Z, a base station 50J, and target local electronic sports servers. The electronic sports terminal 50Z may be an electronic sports terminal satisfying a terminal access condition (namely, a target electronic sports terminal) and may be configured to execute an electronic sports service corresponding to the electronic sports venue 500*c*. The electronic sports terminal 50Z may be any electronic sports terminal in the electronic sports venue 200*c* shown in FIG. 2 above, for example, electronic sports terminal 1*a*. The base station 50J may include a target 5G remote radio unit, a target 5G extension unit, and a target building base band unit. There may be a plurality of target local electronic sports servers in the electronic sports venue 500*c*, for example, 4 in this embodiment of this application, including an electronic sports server 51F, an electronic sports server 52F, an electronic sports server 53F, and an electronic sports server 54F. Each of the 4 target local electronic sports servers corresponds to a different electronic sports client, that is, each target local electronic sports server also corresponds to a different electronic sports service.

The electronic sports terminal 50Z satisfying the terminal access condition may obtain electronic sports service data carrying access identification information when executing the corresponding electronic sports service through the electronic sports client, and then send the electronic sports service data carrying access identification information to the base station 50J shown in FIG. 5. At this point, the base station 50J may receive the electronic sports service data carrying access identification information through the target 5G remote radio unit, and then send the electronic sports service data carrying access identification information to the target 5G extension unit through the target 5G remote radio unit, so that the target 5G extension unit sends the electronic sports service data carrying access identification information to the target building base band unit. Further, the base station 50J may obtain service routing information associated with the target building base band unit shown in FIG. 5, namely, a service routing information table 5000 shown in FIG. 5. The service routing information table 5000 may include service routing information corresponding to each target local electronic sports server shown in FIG. 5. Further, the base station 50J may search for service routing information same as the access identification information in the service routing information table 5000.

If the base station 50J finds the service routing information (for example, service routing information corresponding to the electronic sports server 51F) same as the access identification information in the service routing information table 5000, the base station 50J may directly send the electronic sports service data to the electronic sports server 51F shown in FIG. 5 according to a network connection relationship (namely, a second network connection relationship) between the target building base band unit and the electronic sports server 51F.

Optionally, if the base station 50J does not find the service routing information same as the access identification information in the service routing information table 5000, the base station 50J may filter the electronic sports service data information. That is, there is no target local electronic sports server corresponding to the access identification information in the electronic sports venue 500*c*, namely, the electronic sports terminal 50Z cannot perform data interaction with the target local electronic sports server corresponding to the access identification information through the base station 50J. The data distribution function of the target building base band unit in the base station 50J enables the electronic sports terminal satisfying the terminal access condition in the electronic sports venue 500*c* to access the target local electronic sports server corresponding to the service routing information present in the service routing information table 5000, but not to access the service routing information absent in the service routing information table 5000. That is, this embodiment of this application continues advantages of the 5G private network. Due to the independence of the frequency band of the 5G private network, the 5G private network may be isolated from an external network without interference from other user equipment, thereby reducing the impact of other user equipment and effectively ensuring security and isolation of the network.

In this embodiment of this application, the base stations in the N local electronic sports regions deployed in the 5G private network all have the first network connection relationship with the 5G core network deployed in the cloud. In this case, the electronic sports terminal in any of the N local electronic sports regions (namely, the target local electronic sports region) may execute the electronic sports service corresponding to the target local electronic sports region when satisfying the terminal access condition, to generate electronic sports service data carrying access identification information. Further, when receiving the electronic sports service data carrying access identification information, the target base station in the target local electronic sports region may search for the service routing information same as the access identification information from the service routing information associated with the target base station, and then send the electronic sports service data to the target local electronic sports server corresponding to the service access identification information through the second network connection relationship between the target base station and the target local electronic sports server in the target local electronic sports region upon finding the service routing information same as the access identification information. The 5G private network in this embodiment of this application does not need to deploy the 5G core network separately in each local electronic sports region. This may significantly reduce deployment costs in a case of excessive local electronic sports regions.

Figure 6:
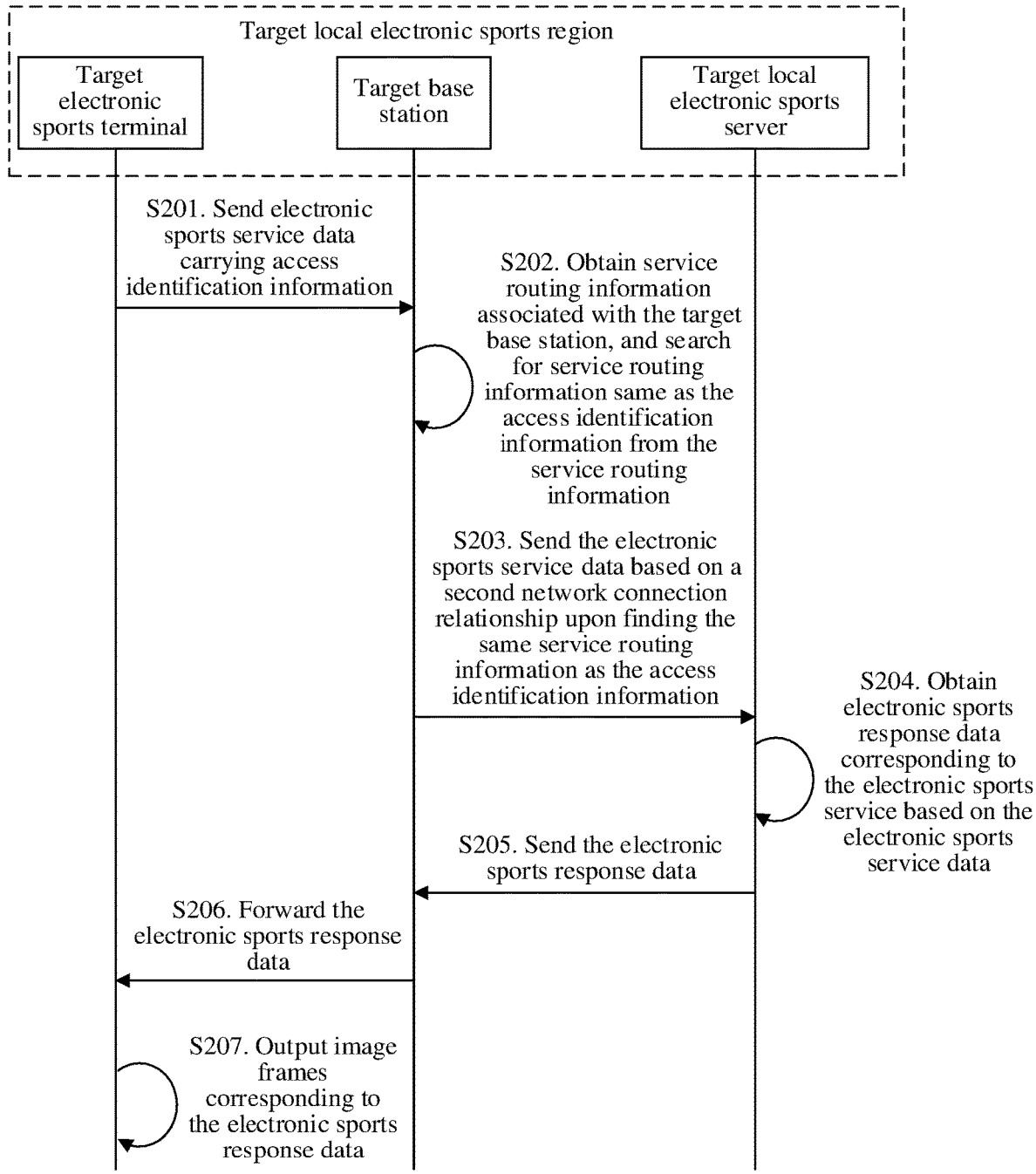
FIG. 6 is a schematic flowchart of an electronic sports data processing method according to an embodiment of this application.

Further, refer to FIG. 6. FIG. 6 is a schematic flowchart of an electronic sports data processing method according to an embodiment of this application. As shown in FIG. 6, the method involves any of N local electronic sports regions (namely, a target local electronic sports region) deployed in a 5G private network. The target local electronic sports region may include a target electronic sports terminal (namely, an electronic sports terminal satisfying a terminal access condition), a target base station with data distribution function, and a target local electronic sports server corresponding to an electronic sports service. The method may include at least steps S201-S206 below.

Step S201. The target electronic sports terminal sends electronic sports service data carrying access identification information to the target base station.

Specifically, in the target local electronic sports region, the electronic sports terminal satisfying the terminal access condition (namely, the target electronic sports terminal) may execute the corresponding electronic sports service through an electronic sports client by using an activated and authorized electronic sports card, to generate the electronic sports service data corresponding to the electronic sports service. Further, the target electronic sports terminal may obtain an IP address configured for the target electronic sports terminal by an SMF network element deployed in a 5G core network of a cloud, use the IP address as the access identification information, and then obtain the electronic sports service data carrying access identification information based on the access identification information and the electronic sports service data. At this point, the target electronic sports terminal may send the electronic sports service data carrying access identification information to the target base station in the target local electronic sports region.

Step S202. The target base station obtains service routing information associated with the target base station, and searches for service routing information same as the access identification information from the service routing information.

Specifically, the target base station may obtain second setting information obtained by a management user corresponding to a management terminal on a second network management platform (for example, a local base station network management platform) after distribution configuration on a base station in each of the N local electronic sports regions. Further, the target base station may determine the service routing information of a target building base band unit in the target base station from the second setting information, and search for the service routing information same as the access identification information from the service routing information.

Step S203. The target base station sends the electronic sports service data to the target local electronic sports server corresponding to the access identification information based on a second network connection relationship between the target base station and the target local electronic sports server upon finding the service routing information same as the access identification information.

Specifically, upon finding the service routing information same as the access identification information, the target base station may directly send the electronic sports service data to the target local electronic sports server corresponding to the access identification information based on the second network connection relationship between the target base station and the target local electronic sports server in the target local electronic sports region. The second network connection relationship here refers to a network connection relationship between the target building base band unit in the target base station and the target local electronic sports server corresponding to the electronic sports service.

For specific implementations of steps S201-S203, reference may be made to the descriptions of steps S101-S103 in the embodiment corresponding to FIG. 3 above.

Step S204. The target local electronic sports server obtains electronic sports response data of the electronic sports service based on the electronic sports service data.

Specifically, when receiving the electronic sports service data sent by the target building base band unit in the target base station, the target local electronic sports server may determine image frames corresponding to the electronic sports client based on the electronic sports service data, and then determine the electronic sports service response data of the electronic sports service based on the determined image frames.

If the electronic sports client configured to execute the electronic sports service in this embodiment of this application is a cloud game, the target local electronic sports server deployed in the target local electronic sports region may be a cloud server corresponding to the cloud game. The electronic sports service data here may be generated by the target electronic sports terminal in response to a trigger operation on the electronic sports client. The trigger operation here may include a contact operation such as click or long press, or a non-contact operation such as voice or gesture, and will not be limited here. For example, when an electronic sports user corresponding to the target electronic sports terminal performs a trigger operation (for example, a left slide operation) on a terminal interface of the target electronic sports terminal, the target electronic sports terminal may generate the electronic sports service data corresponding to the electronic sports service in response to the trigger operation.

When the target local electronic sports server receives the electronic sports service data forwarded by the target base station, the target local electronic sports server may control, based on a left slide instruction indicated by the electronic sports service data, a virtual object in the electronic sports client to slide to the left, and then obtain the image frames after sliding to the left (for example, a game image frame of the cloud game). In order to improve transmission efficiency, the target local electronic sports server may encode the obtained image frames to obtain a video encoding stream before returning the image frames to the target electronic sports terminal. Further, the target local electronic sports server may use the video encoding stream as the electronic sports response data of the electronic sports service.

Step S205. The target local electronic sports server sends the electronic sports response data to the target base station.

Specifically, the target local electronic sports server forwards the electronic sports response data to a target 5G extension unit through the target building base band unit in the target base station, so that the target 5G extension unit forwards the electronic sports response data to a target 5G remote radio unit.

Step S206. The target base station returns the electronic sports response data to the target electronic sports terminal.

Specifically, the target base station may return the electronic sports response data to the target electronic sports terminal through the target 5G remote radio unit. The target base station may not only return the electronic sports response data to the target electronic sports terminal configured to send the electronic sports service data, but also push the electronic sports response data to other electronic sports terminals that perform the current electronic sports service in the target local electronic sports region besides the target electronic sports terminal, so as to achieve data synchronization.

Step S207. The target electronic sports terminal outputs the image frames corresponding to the electronic sports response data.

Specifically, when receiving the electronic sports response data sent by the target base station, the target electronic sports terminal may decode the electronic sports response data to obtain the image frames corresponding to the electronic sports response data. At this point, the target electronic sports terminal may output the image frames corresponding to the electronic sports response data to the terminal interface of the target electronic sports terminal.

The 5G private network may include a management terminal configured to manage a communication system corresponding to the 5G private network. Each of the N local electronic sports regions deployed in the 5G private network includes an electronic sports terminal, a base station, and a local electronic sports server. The building base band unit in the base station of each local electronic sports region has a data distribution function. For example, the target building base band unit of the target base station (the base station in any local electronic sports region) has a first network connection relationship with the target local electronic sports server in the target local electronic sports region where the target base station is located, and the target building base band unit has a second network connection relationship with the 5G core network deployed in the cloud.

In an initial status, the management user corresponding to the management terminal may log in to a first network management platform (for example, a 5G core network management platform) associated with the 5G private network in advance, and then set network elements deployed in the 5G core network of the cloud. For example, the management user may set parameter information such as card information, signal strength, spectrum, bandwidth, and signal-to-noise ratio for electronic sports cards with access permissions. When the management user completes the setting, the management terminal may refer to the setting information obtained by the management user for the network elements deployed in the 5G core network of the cloud as first setting information. Further, the management terminal determines, from the base stations in the 5G private network, a base station having an optimal network connection relationship (for example, a target base station), and may then send the first setting information to the target base station, so that the target base station may forward, through the target building base band unit and the first network connection relationship, the first setting information to the 5G core network deployed in the cloud, and the 5G core network deployed in the cloud stores the first setting information.

The 5G core network deployed in the cloud in this embodiment of this application may include a first function network element, a second function network element, and a third function network element. The first function network element (for example, an AMF network element) may be configured to implement access and mobility management functions. The second function network element (for example, an SMF network element) may be configured to implement a session management function, and the third function network element (for example, a UDM network element) may be configured to implement unified data management. Therefore, when the management terminal sends the first setting information to the target base station based on the target building base band unit and the first network connection relationship, the target base station may forward the first setting information to the AMF network element deployed in the 5G core network of the cloud, so that the AMF network element may forward the first setting information to the SMF network element. Further, the SMF network element deployed in the 5G core network of the cloud may send the first setting information to the UDM network element, so that the UDM network element stores the first setting information.

In some embodiments, the method further includes: receiving a card activation request sent by the management terminal, the card activation request carrying card information of a to-be-activated electronic sports card; and forwarding the card activation request to the first function network element through the target building base band unit, so that the first function network element forwards the card activation request to the second function network element, where the second function network element is configured to authenticate the card activation request based on the first setting information and the card information, and store the card information in the third function network element when the authentication succeeds; and the card information stored in the third function network element is card information corresponding to electronic sports cards used by electronic sports terminals in the at least two local electronic sports regions.

The management user corresponding to the management terminal may further activate a card for an electronic sports user who needs to participate in the electronic sports service, and then the electronic sports user may participate in the electronic sports service in the electronic sports terminal of a local electronic sports region by using the activated electronic sports card. The management user corresponding to the management terminal may perform a card activation operation on the to-be-activated electronic sports card, so that the management terminal may determine the card information of the to-be-activated electronic sports card in response to the card activation operation. Further, the management terminal may generate, based on the card information of the to-be-activated electronic sports card, the card activation request sent to the target base station. When receiving the card activation request, the target base station may forward the card activation request to the AMF network element deployed in the 5G core network of the cloud through the target building base band unit and the first network connection relationship, so that the AMF network element forwards the card activation request to the SMF network element. Further, the SMF network element deployed in the 5G core network of the cloud may authenticate the card activation request based on the first setting information and the card information of the to-be-activated electronic sports card, and perform card activation and activation processing on an electronic sports account corresponding to the to-be-activated electronic sports card.

When the card information matches the first setting information, the SMF network element may determine that the card activation request succeeds in authentication, that is, the card activation request is a valid request, and the SMF network element may perform card activation and activation processing on the electronic sports account corresponding to the to-be-activated electronic sports card and then store the card information carried by the card activation request in the UDM network element, indicating that the to-be-activated electronic sports card is successfully activated. Optionally, when the card information does not match the first setting information, the SMF network element may determine that the card activation request fails in authentication, that is, the card activation request is an invalid request, indicating that the to-be-activated electronic sports card is not successfully activated.

Figure 7:
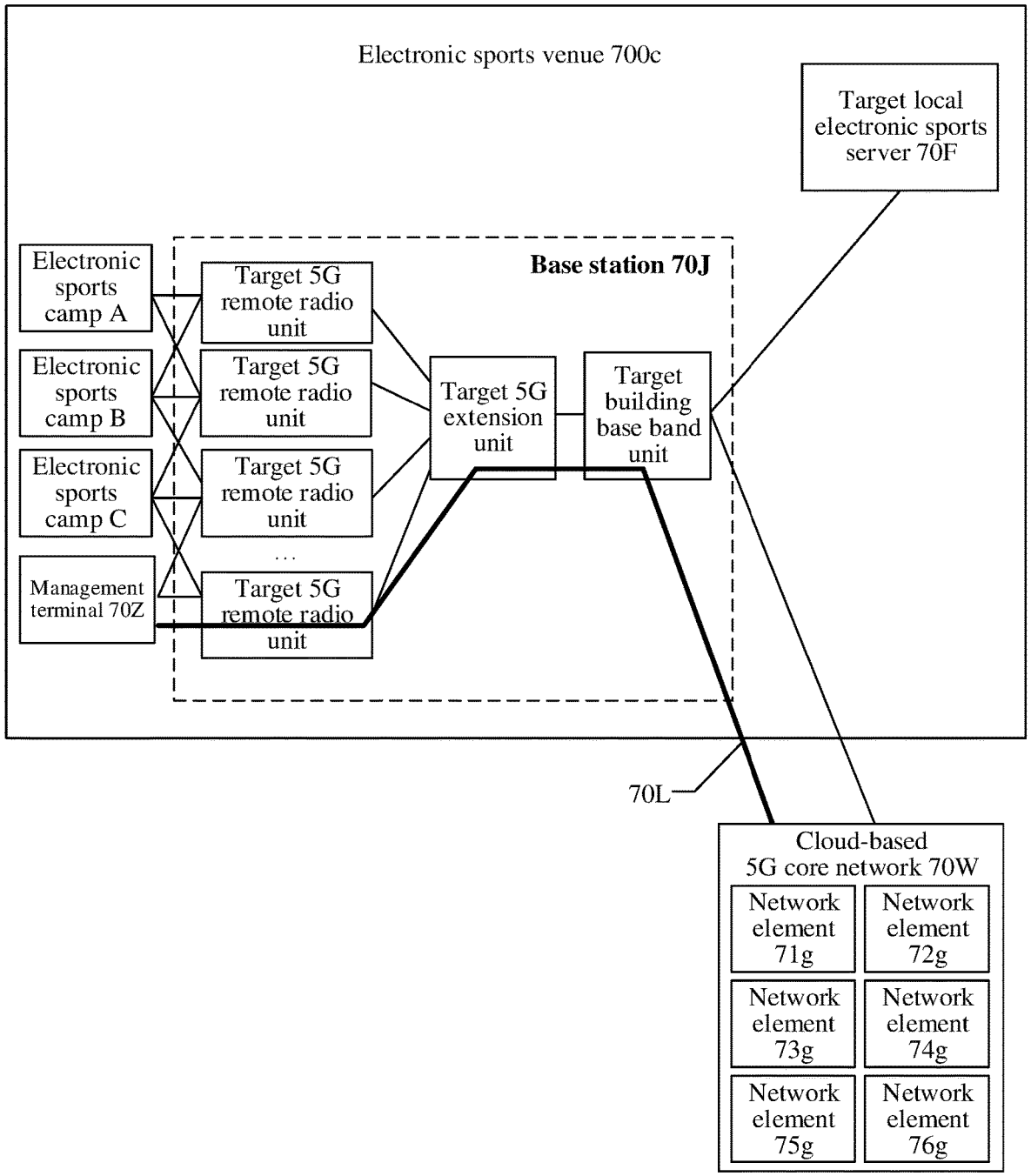
FIG. 7 is a schematic diagram showing a scenario for activating a to-be-activated electronic sports card by a management terminal through a 5G core network deployed in a cloud according to an embodiment of this application.

For the convenience of understanding, further, refer to FIG. 7. FIG. 7 is a schematic diagram showing a scenario for activating a to-be-activated electronic sports card by a management terminal through a 5G core network deployed in a cloud according to an embodiment of this application. As shown in FIG. 7, a 5G private network may include a 5G core network (for example, a 5G core network 70W shown in FIG. 7) deployed in a cloud and a management terminal (for example, a management terminal 70Z shown in FIG. 7) configured to manage a communication system corresponding to the 5G private network, where the management terminal 70Z may be deployed in an electronic sports venue 700c and has an optimal network connection relationship with a base station 70J in the electronic sports venue 700c. The electronic sports venue 700c (namely, a target local electronic sports region) may be any of N local electronic sports regions deployed in the 5G private network. The electronic sports venue 700c may include electronic sports terminals, a base station 70J, and a target local electronic sports server 70F configured to execute an electronic sports service. The communication system corresponding to the electronic sports venue 700c may refer to the communication system 1X shown in FIG. 1 above.

The electronic sports venue 700c may include a plurality of electronic sports camps configured for competition against the same electronic sports service, as shown in FIG. 7. The plurality of (for example, 3) electronic sports camps may include an electronic sports camp A, an electronic sports camp B, and an electronic sports camp C. Each electronic sports camp may include a plurality of electronic sports terminals, which are not limited here.

The base station 70J shown in FIG. 7 may include target 5G remote radio units with data reception function, a target 5G extension unit with data integration function, and a target building base band unit with data distribution function. The base station 70J may include E target 5G remote radio units, where E is a positive integer. As shown in FIG. 7, each target 5G remote radio unit in the E target 5G remote radio units is configured to communicate with the electronic sports terminals in the electronic sports camps or the management terminal 70Z shown in FIG. 7, and each target 5G remote radio unit is further configured to communicate with the target 5G extension unit. In FIG. 7, the target building base band unit has a first network connection relationship with the 5G core network 70W, and the target building base band unit has a second network connection relationship with the target local electronic sports server 70F.

The 5G core network 70W may include one or more network elements. A quantity of the network elements in the 5G core network 70W is not limited here. For example, the 5G core network 70W may include a network element 71g (for example, an AMF network element, namely, a first function network element), a network element 72g (for example, an SMF network element, namely, a second function network element), a network element 73g (for example, a UDM network element, namely, a third function network element), a network element 74g (for example, an AUSF network element), a network element 75g (for example, a UPF network element), and a network element 76g (for example, a PCF network element).

A line 70L shown in FIG. 7 may be a data transmission process of activating a to-be-activated electronic sports card by the management terminal 70Z in this embodiment of this application through the 5G core network 70W. When a management user corresponding to the management terminal 70Z performs a card activation operation on the to-be-activated electronic sports card, the management terminal 70Z may determine card information of the to-be-activated electronic sports card in response to a trigger operation. The card information here may be configured for the to-be-activated electronic sports card by using an information input device (for example, a card burning device). Further, the management terminal 70Z may generate, based on the card information of the to-be-activated electronic sports card, a card activation request sent to the base station 70J.

The base station 70J may receive, through a target 5G remote radio unit deployed in the electronic sports venue 700c, the card activation request sent by the management terminal 70Z, and then forward the received card activation request to the target 5G extension unit. The target 5G remote radio unit configured to receive the card activation request is determined based on parameters such as network status, location distance from the management terminal 70Z, capacity, and idle duty cycle of each of the E target 5G remote radio units shown in FIG. 7. Further, the base station 70J may forward the card activation request to the target building base band unit through the target 5G extension unit shown in FIG. 7, so that the target building base band unit may send the card activation request to the 5G core network 70W based on the first network connection relationship.

At this point, the network element 71g in the 5G core network 70W may receive the card activation request forwarded by the target building base band unit, and may then send the card activation request to the network element 72g, so that the network element 72g authenticates the card activation request. The network element 72g may obtain first setting information set by the management user on a first network management platform, and then match the first setting information with the card information carried by the card activation request.

When the card information does not match the first setting information, the network element 72g may determine that the card activation request fails in authentication, that is, the card activation request is an invalid request, indicating that the to-be-activated electronic sports card is not successfully activated. Optionally, when the card information matches the first setting information, the network element 72g may determine that the card activation request succeeds in authentication, that is, the card activation request is a valid request, and the network element 72g may perform card activation and activation processing on an electronic sports account corresponding to the to-be-activated electronic sports card and then store the card information carried by the card activation request in the network element 73g, indicating that the to-be-activated electronic sports card is successfully activated.

When the electronic sports card is successfully activated, an electronic sports user associated with the electronic sports venue 700c may install the successfully activated electronic sports card into his electronic sports terminal, and then participate in the electronic sports service according to the successfully activated electronic sports card. When the electronic sports terminal equipped with the successfully activated electronic sports card satisfies a terminal access condition, the base station 70J and the target local electronic sports server 70F shown in FIG. 7 may implement data interaction.

In this embodiment, the 5G core network deployed in the cloud uniformly processes card activation tasks by using the first function network element, the second function network element, and the third function network element, without deploying the 5G core network in each local electronic sports region, thereby reducing deployment costs of the 5G core network.

In some embodiments, the method further includes: receiving second setting information sent by the management terminal and forwarding the second setting information to the target 5G extension unit through the target 5G remote radio unit, the second setting information being determined after distribution configuration on a base station in each local electronic sports region, and the second network management platform being different from the first network management platform; forwarding the second setting information to the target building base band unit through the target 5G extension unit; and forwarding the second setting information to the 5G core network through the target building base band unit, so that the 5G core network stores the second setting information, the second setting information including the service routing information associated with the target base station.

The second setting information is determined by the management user on the second network management platform after distribution configuration on the base station in each of the N local electronic sports regions.

Meanwhile, in an initial status, the management user corresponding to the management terminal may alternatively log in to the second network management platform associated with the 5G private network (for example, a local base station network management platform) in advance, and then perform distribution configuration on the base station in each of the N local electronic sports regions deployed in the 5G private network. For example, the management user may set parameter information such as channels, signal-to-noise ratio, and amplification power for the 5G remote radio units in each base station, set service routing information for the building base band unit in each base station, and the like. When the management user completes the setting, the management terminal may refer to the setting information determined by the management user after distribution configuration on each base station as the second setting information. Further, the management terminal may send the second setting information to the base station having the optimal network connection relationship with the management terminal (such as a target base station), so that the target base station may forward, through the target building base band unit and the first network connection relationship, the second setting information to the 5G core network deployed in the cloud, and the 5G core network deployed in the cloud stores the second setting information. A specific implementation of receiving the second setting information by the base station in this embodiment of this application may refer to the foregoing specific implementation of receiving the first setting information by the base station.

In this embodiment of this application, the base stations in the N local electronic sports regions deployed in the 5G private network all have the first network connection relationship with the 5G core network deployed in the cloud. In this case, the electronic sports terminal in any of the N local electronic sports regions (namely, the target local electronic sports region) may execute the electronic sports service corresponding to the target local electronic sports region when satisfying the terminal access condition, without deploying the 5G core network of the cloud in each local electronic sports region separately, thereby reducing deployment costs. Moreover, in the target local electronic sports region, the electronic sports terminal satisfying the terminal access condition (namely, the target electronic sports terminal) may generate electronic sports service data carrying access identification information after executing the corresponding electronic sports service in the target local electronic sports region, and send the electronic sports service data to the target base station in the target local electronic sports region. The target base station may search for service routing information same as the access identification information from the service routing information associated with the target base station, and then quickly send the electronic sports service data to the target local electronic sports server through the data distribution function of the building base band unit in the target base station during search, without sending the electronic sports service data to the target local electronic sports server through the 5G core network in the 5G private network, thereby effectively reducing data processing duration of the electronic sports service data in the 5G core network, improving data transmission efficiency, and reducing latency of the electronic sports service data. Because the 5G private network is an emerging technology, some abnormalities may occur in the 5G private network, resulting in abnormalities in the 5G core network deployed in the cloud and even abnormalities in the card activation process and the authentication process. In this embodiment of this application, the electronic sports service data may be directly sent to the target local electronic sports region data corresponding to the access identification information through the target base station, so even if abnormalities occur in the 5G core network deployed in the cloud, a bad impact is not produced on the ongoing electronic sports service. Therefore, this embodiment of this application may effectively ensure low latency and stability required for executing the electronic sports service.

In this embodiment, the target 5G extension unit forwards the second setting information to the target building base band unit, the target building base band unit forwards the second setting information to the 5G core network deployed in the cloud, and the 5G core network in the cloud stores the service routing information associated with the target base station, so that the 5G core network in the cloud uniformly manages the service routing information associated with the target base station, the 5G core network does not need to be deployed in each local electronic sports region, and deployment costs of the 5G core network are reduced accordingly.

In some embodiments, the 5G private network includes a management terminal and a 5G core network deployed in the cloud; and the method further includes: receiving a permission verification request sent by the management terminal, the permission verification request being generated by the management terminal for to-be-verified card information used by a to-be-verified electronic sports terminal; forwarding the permission verification request to the 5G core network, so that the 5G core network obtains status information of the to-be-verified card information from a status verification information table based on the permission verification request, the status verification information table being established based on card information of electronic sports terminals in the at least two local electronic sports regions; and receiving the status information returned by the 5G core network, and returning the status information to the management terminal, so that the management terminal generates, based on the status information and the terminal access condition, notification information associated with the to-be-verified electronic sports terminal.

The target base station is a base station having an optimal network connection relationship with the management terminal, which is determined from the base stations deployed in the 5G private network; the management terminal is configured to verify a permission of the to-be-verified electronic sports terminal; and the to-be-verified electronic sports terminal is an electronic sports terminal that starts an electronic sports client, which is detected by the management terminal in the N local electronic sports regions. The UDM network element deployed in the 5G core network of the cloud may establish the status verification information table based on the card information of the electronic sports terminals in the N local electronic sports regions.

Specifically, the target base station may receive, based on the optimal network connection relationship, the permission verification request sent by the management terminal; the permission verification request is generated by the management terminal for the to-be-verified card information used by the to-be-verified electronic sports terminal; through the first network connection relationship between the target base station and the 5G core network deployed in the cloud, the permission verification request is forwarded to the 5G core network deployed in the cloud, so that the 5G core network deployed in the cloud obtains the status information of the to-be-verified card information from the status verification information table based on the permission verification request; the status verification information table is established by the third function network element deployed in the 5G core network of the cloud based on the card information of the electronic sports terminals in the N local electronic sports regions; and the status information returned by the 5G core network deployed in the cloud is received, and the status information is returned to the management terminal based on the optimal network connection relationship, so that the management terminal generates the notification information associated with the to-be-verified electronic sports terminal based on the status information and the terminal access condition.

For the convenience of understanding, further, refer to Table 2. Table 2 is a status verification information table according to this embodiment of this application. The status verification information table 2 may include electronic sports accounts, card activation timestamps, status information, and the like of activated and authorized electronic sports cards. The status verification information table may also include other information such as access addresses of the electronic sports cards (for example, a local electronic sports region in the 5G private network).

TABLE 2

| Electronic sports account | Card activation timestamp | Status information |
|---|---|---|
| Electronic sports account 1 | Timestamp 1 | Unconnected status |
| Electronic sports account 2 | Timestamp 2 | Connected status |
| ... | ... | ... |
| Electronic sports account n | Timestamp n | Unconnected status |

As shown in Table 2 above, the status verification information table may include electronic sports cards used by all electronic sports terminals in the N local electronic sports regions deployed in the 5G private network. Table 2 may be a status verification information table maintained in real time by the UDM network element deployed in the 5G core network of the cloud. For example, the card activation timestamp of the electronic sports account 1 in Table 2 may be timestamp 1 (for example, Oct. 10, 2020, 13:00:00), and the status information of the electronic sports account 1 is "unconnected status" (namely, a first status), indicating that the electronic sports terminal where the electronic sports card corresponding to the electronic sports account 1 is located is currently not executing an electronic sports service. The activation timestamp of the electronic sports account 2 in Table 2 may be timestamp 2 (for example, Mar. 10, 2021, 09:00:00), and the status information of the electronic sports account 2 is "connected status" (namely, a second status), indicating that the electronic sports terminal where the electronic sports card corresponding to the electronic sports account 2 is located is currently executing an electronic sports service in a local electronic sports region of the 5G private network. By analogy, the card activation timestamp of the electronic sports account n in Table 2 may be timestamp n (for example, Jun. 5, 2021, 11:30:10), and the status information of the electronic sports account n is "unconnected status", indicating that the electronic sports terminal where the electronic sports card corresponding to the electronic sports account n is located has not yet executed an electronic sports service.

Specifically, the 5G core network deployed in the cloud may receive, through the AMF network element, the permission verification request sent by the target base station, and then send the permission verification request to the SMF network element through the AMF network element, so that the SMF network element obtains the to-be-verified card information carried in the permission verification request. The to-be-verified card information may include a to-be-verified electronic sports account. Further, the 5G core network deployed in the cloud may obtain the foregoing status verification information table 2 from the UDM network element, then search for a same electronic sports account as the to-be-verified electronic sports account from the status verification information table, and determine the status information of the to-be-verified card information based on the found electronic sports account. At this point, the 5G core network deployed in the cloud may return the status information to the target base station, so that the target base station may return the status information to the management terminal based on the optimal network connection relationship. Further, the management terminal may generate, based on the status information and the terminal access condition, the notification information associated with the to-be-verified electronic sports terminal.

In this embodiment, the notification information associated with the to-be-verified electronic sports terminal is generated by using the status verification information table, so as to accurately verify the permission of the to-be-verified electronic sports terminal.

In some embodiments, the notification information is first notification information generated by the management terminal when determining that the to-be-verified electronic sports terminal satisfies the terminal access condition; and the method further includes: receiving, based on the optimal network connection relationship, the first notification information sent by the management terminal; and sending the first notification information to the to-be-verified electronic sports terminal through the network connection relationship between the target base station and the to-be-verified electronic sports terminal, the first notification information being used for indicating that the to-be-verified electronic sports terminal succeeds in verification.

If the same electronic sports account as the to-be-verified electronic sports account, found by the 5G core network deployed in the cloud from Table 2 above, is electronic sports account 1, the 5G core network deployed in the cloud may use the status information of electronic sports account 1 as the status information corresponding to the to-be-verified card information (namely, the first status, for example, "unconnected status"). At this time, the 5G core network deployed in the cloud may send the status information belonging to the first status to the target base station, so that the target base station returns the status information belonging to the first status to the management terminal based on the optimal network connection relationship. When receiving the status information belonging to the first status, the management terminal may determine that the to-be-verified electronic sports terminal satisfies the terminal access condition, and then generate the first notification information used for indicating that the to-be-verified electronic sports terminal succeeds in verification. If the to-be-verified electronic sports terminal is an electronic sports terminal in the target local electronic sports region of the 5G private network, the management terminal may send the first notification information to the target base station based on the optimal network connection relationship between the management terminal and the target base station.

In some embodiments, the target base station may receive, based on the optimal network connection relationship, the first notification information sent by the management terminal; and send the first notification information to the to-be-verified electronic sports terminal through the network connection relationship between the target base station and the to-be-verified electronic sports terminal.

Further, the target base station may send the first notification information to the to-be-verified electronic sports terminal through the network connection relationship between the target base station and the to-be-verified electronic sports terminal, so that the to-be-verified electronic sports terminal outputs the first notification information to an electronic sports user corresponding to the to-be-verified electronic sports terminal, to inform the electronic sports user corresponding to the verified electronic sports terminal that the to-be-verified electronic sports terminal has an access permission to the 5G private network, so as to execute the electronic sports service in the target local electronic sports region. For example, the first notification information may be "You have successfully accessed to the 5G private network and can execute the electronic sports service in this electronic sports region".

Meanwhile, the target base station may further forward, through the first network connection relationship between the target base station and the 5G core network deployed in the cloud, the first notification information to the 5G core network deployed in the cloud. When receiving the first notification information, the 5G core network deployed in the cloud may determine that the to-be-verified electronic sports terminal succeeds in verification. At this time, the 5G core network deployed in the cloud may change the status information corresponding to the to-be-verified card information from the first status to a second status through the UDM network element. That is, the 5G core network deployed in the cloud may change the status information of electronic sports account 1 from "unconnected status" to "connected status" through the UDM network element, to indicate that the electronic sports terminal where electronic sports account 1 is located is executing the electronic sports service.

In this embodiment, the first notification information used for indicating that the to-be-verified electronic sports terminal succeeds in verification is sent to the to-be-verified electronic sports terminal, so that the to-be-verified electronic sports terminal may determine success in verification based on the first notification information.

In some embodiments, the method further includes: forwarding the first notification information to the 5G core network, so that the third function network element in the 5G core network changes the status information corresponding to the to-be-verified card information from the first status to the second status.

Specifically, if the same electronic sports account as the to-be-verified electronic sports account, found by the 5G core network deployed in the cloud from Table 2 above, is electronic sports account 2, the 5G core network deployed in the cloud may use the status information of electronic sports account 2 as the status information corresponding to the to-be-verified card information (namely, the second status, for example, "connected status"). At this time, the 5G core network deployed in the cloud may send status information belonging to the second status to the target base station, so that the target base station returns the status information belonging to the second status to the management terminal based on the optimal network connection relationship.

In some embodiments, the target base station may forward, through the first network connection relationship between the target base station and the 5G core network deployed in the cloud, the first notification information to the 5G core network deployed in the cloud, so that the third function network element deployed in the 5G core network of the cloud changes the status information corresponding to the to-be-verified card information from the first status to the second status.

In this embodiment, the status information of the to-be-verified card information is changed according to the notification information, thereby updating the status information in a timely manner.

In some embodiments, the notification information is second notification information generated by the management terminal when determining that the to-be-verified electronic sports terminal does not satisfy the terminal access condition; and the method further includes: receiving the second notification information sent by the management terminal; and sending the second notification information to the to-be-verified electronic sports terminal, the second notification information being used for indicating that the to-be-verified electronic sports terminal fails in verification.

Specifically, when receiving status information belonging to the second status, the management terminal may determine that the to-be-verified electronic sports terminal does not satisfy the terminal access condition, and then generate the second notification information used for indicating that the verified electronic sports terminal fails in verification. If the to-be-verified electronic sports terminal is an electronic sports terminal in the target local electronic sports region of the 5G private network, the management terminal may send the second notification information to the target base station based on the optimal network connection relationship between the management terminal and the target base station.

In some embodiments, the second notification information sent by the management terminal is received based on the optimal network connection relationship; and the second notification information is sent to the to-be-verified electronic sports terminal through the network connection relationship between the target base station and the to-be-verified electronic sports terminal, the second notification information being used for indicating that the to-be-verified electronic sports terminal fails in verification.

Further, the target base station may send the second notification information to the to-be-verified electronic sports terminal through the network connection relationship between the target base station and the to-be-verified electronic sports terminal, so that the to-be-verified electronic sports terminal outputs the second notification information to the electronic sports user corresponding to the to-be-verified electronic sports terminal, to inform the electronic sports user corresponding to the verified electronic sports terminal that the to-be-verified electronic sports terminal does not have an access permission to the 5G private network, that is, cannot execute the electronic sports service in the target local electronic sports region temporarily. For example, the second notification information may be "You have not successfully accessed the 5G private network and cannot execute the electronic sports service in this electronic sports region temporarily".

In this embodiment, the second notification information used for indicating that the to-be-verified electronic sports terminal fails in verification is sent to the to-be-verified electronic sports terminal, so that the to-be-verified electronic sports terminal may determine failure in verification based on the second notification information.

In some embodiments, the method further includes: forwarding, through the first network connection relationship between the target base station and the 5G core network deployed in the cloud, the second notification information to the 5G core network deployed in the cloud, so that the 5G core network deployed in the cloud may search for card information having same electronic sports account as the to-be-verified card information in the third function network element based on the second notification information, and delete card information except card information with latest card activation timestamps based on a card activation timestamp of the found card information.

Specifically, the target base station may further forward, through the first network connection relationship between the target base station and the 5G core network deployed in the cloud, the second notification information to the 5G core network deployed in the cloud. The 5G core network deployed in the cloud searches for the card information having same electronic sports account as the to-be-verified card information in the third function network element based on the second notification information, and delete the card information except the card information with latest card activation timestamps based on the card activation timestamp of the found card information.

In some embodiments, when receiving the second notification information, the 5G core network deployed in the cloud may determine that the to-be-verified electronic sports terminal fails in verification. This means that the 5G core network deployed in the cloud may have information confusion due to unstable network status, resulting in a situation that the same electronic sports account corresponds to a plurality of electronic sports cards. At this point, the 5G core network deployed in the cloud needs to check this situation in the UDM network element to ensure that one electronic sports account corresponds to one electronic sports card. The 5G core network deployed in the cloud may search for the card information having same electronic sports account as the to-be-verified card information in the UDM network element based on the second notification information. Further, the 5G core network deployed in the cloud may obtain the card activation timestamp of the found card information, retain the card information with the latest activation timestamps, and delete other card information except the card information with the latest activation timestamps. Further, the 5G core network deployed in the cloud may update Table 2 above to delete repeated electronic sports accounts from the status verification information table 2.

In order to avoid information confusion, the management terminal may alternatively send an account check request regularly (for example, every ten days, every other day, or every half an hour), and send the account check request to the 5G core network deployed in the cloud through the base station having an optimal network connection relationship with the management terminal, so that the 5G core network deployed in the cloud checks the electronic sports account of each activated and authorized electronic sports card in the UDM network element, retains the card information with the latest activation timestamps when electronic sports accounts are repeated, and deletes other card information of the repeated electronic sports accounts.

In this embodiment, deleting the card information except the card information with the latest activation timestamps manages the card information in a timely manner.

In some embodiments, the target local electronic sports region includes M electronic sports terminals; M is a positive integer; the M electronic sports terminals include first electronic sports terminals belonging to a first electronic sports camp and second electronic sports terminals belonging to a second electronic sports camp; and the first electronic sports camp and the second electronic sports camp belong to different electronic sports camps.

In this embodiment, the first electronic sports camp and the second electronic sports camp belong to different electronic sports camps, so the 5G core network in the cloud may serve a plurality of electronic sports camps, and utilization of the 5G core network in the cloud is improved.

In some embodiments, a quantity of target 5G remote radio units in the target base station is E, where E is a positive integer; each of the E target 5G remote radio units is configured to receive service data information; the service data information includes first service data information and second service data information; the first service data information is sent by the management terminal; and the second service data information is sent by the electronic sports terminal satisfying the terminal access condition in the target local electronic sports region.

In this embodiment, the quantity of the target 5G remote radio units in the target base station is E, which enables separate processing of a plurality of pieces of service data information by using the plurality of target 5G remote radio units, thereby improving information processing efficiency.

Figure 8:
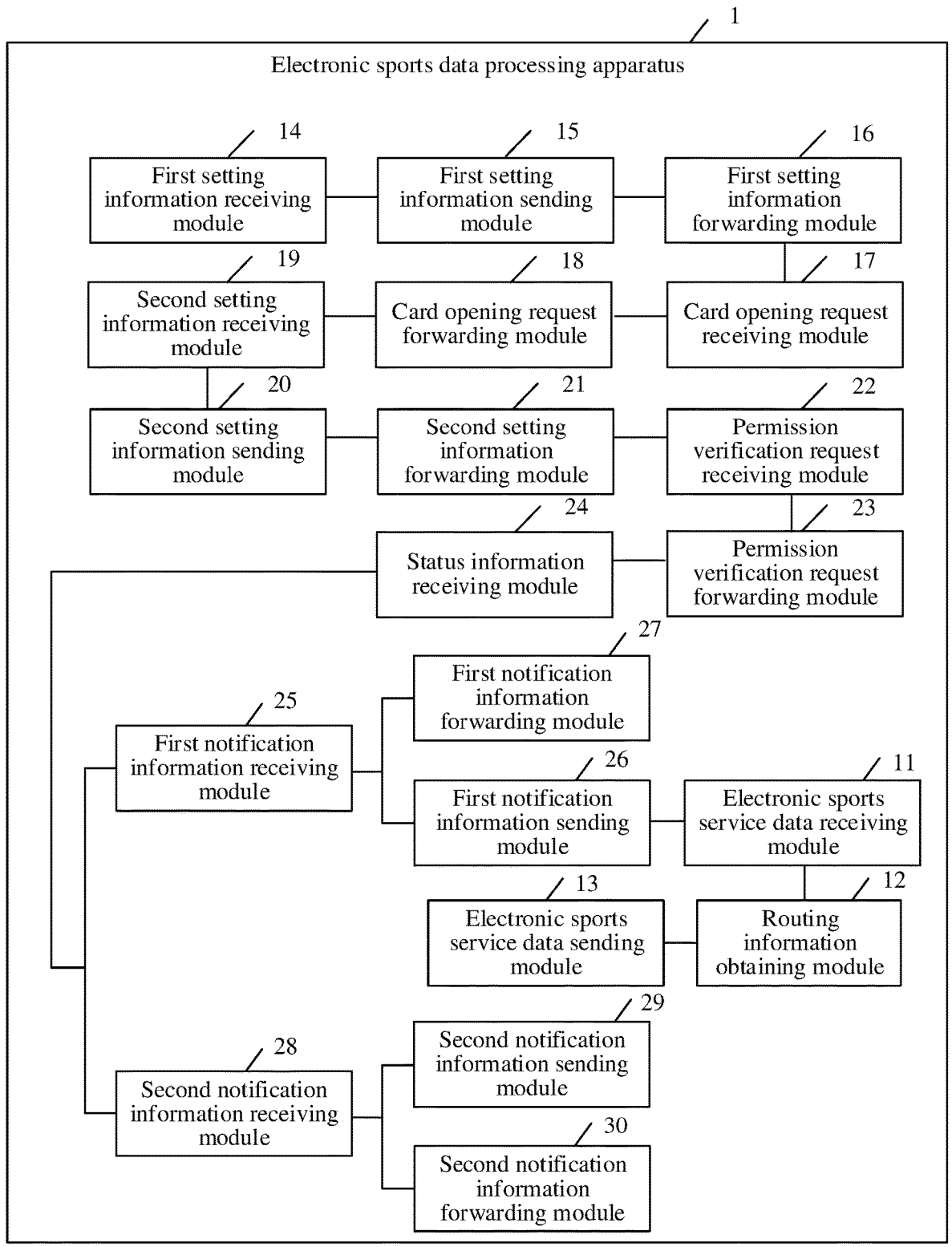
FIG. 8 is a schematic structural diagram of an electronic sports data processing apparatus according to an embodiment of this application.

Further, refer to FIG. 8. FIG. 8 is a schematic structural diagram of an electronic sports data processing apparatus according to an embodiment of this application. The electronic sports data processing apparatus 1 may be a computer-readable instruction (including program code) running in a computer device, for example, the electronic sports data processing apparatus 1 is application software; and the electronic sports data processing apparatus 1 may be configured to perform the corresponding steps in the method provided in the embodiments of this application. As shown in FIG. 8, the electronic sports data processing apparatus 1 may run in a base station (namely, a target base station) in any of N local electronic sports regions in a 5G private network. The target base station may be the base station 20J in the embodiment corresponding to FIG. 2, where N is a positive integer. The electronic sports data processing apparatus 1 may include: an electronic sports service data receiving module 11, a routing information obtaining module 12, an electronic sports service data sending module 13, a first setting information receiving module 14, a first setting information sending module 15, a first setting information forwarding module 16, a card activation request receiving module 17, a card activation request forwarding module 18, a second setting information receiving module 19, a second setting information sending module 20, a second setting information forwarding module 21, a permission verification request receiving module 22, a permission verification request forwarding module 23, a status information receiving module 24, a first notification information receiving module 25, a first notification information sending module 26, a first notification information forwarding module 27, a second notification information receiving module 28, a second notification information sending module 29, and a second notification information forwarding module 30.

The electronic sports service data receiving module 11 is configured to, when an electronic sports terminal in a target local electronic sports region is determined by a 5G private network to satisfy a terminal access condition, receive electronic sports service data carrying access identification information sent by the electronic sports terminal, the target local electronic sports region belonging to at least two local electronic sports regions deployed in the 5G private network;

The routing information obtaining module 12 is configured to search for service routing information same as the access identification information from service routing information associated with a target base station in the target local electronic sports region.

The electronic sports service data sending module 13 is configured to send the electronic sports service data to a target local electronic sports server corresponding to the access identification information upon finding the service routing information same as the access identification information, so that the target local electronic sports server obtains electronic sports response data of an electronic sports service based on the electronic sports service data.

In some embodiments, the target base station includes a target 5G remote radio unit, a target 5G extension unit, and a target building base band unit; the 5G private network includes a management terminal and a 5G core network deployed in the cloud; and the first setting information receiving module 14 is configured to receive first setting information sent by the management terminal and forward the first setting information to the target 5G extension unit through the target 5G remote radio unit, the first setting information being determined based on network elements in the 5G core network.

The first setting information sending module 15 is configured to forward the first setting information to the target building base band unit through the target 5G extension unit.

The first setting information forwarding module 16 is configured to forward the first setting information to the 5G core network through the target building base band unit, so that the 5G core network stores the first setting information.

In some embodiments, the 5G core network includes a first function network element, a second function network element, and a third function network element; the first function network element is configured to implement access and mobility management functions; the second function network element is configured to implement a session management function; and the third function network element is configured to implement unified data management.

The first setting information forwarding module 16 is further configured to:
  forward the first setting information to the first function network element through the target building base band unit, so that the first function network element forwards the first setting information to the second function network element, where the second function network element is configured to store the first setting information to the third function network element.

In some embodiments, the card activation request receiving module 17 is configured to receive a card activation request sent by the management terminal, the card activation request carrying card information of a to-be-activated electronic sports card; and
  the card activation request forwarding module 18 is configured to forward the card activation request to the first function network element through the target building base band unit, so that the first function network element forwards the card activation request to the second function network element, where the second function network element is configured to authenticate the card activation request based on the first setting information and the card information, and store the card information in the third function network element when the authentication succeeds; and the card information stored in the third function network element is card information corresponding to electronic sports cards used by electronic sports terminals in the at least two local electronic sports regions.

In some embodiments, the second setting information receiving module 19 is configured to receive second setting information sent by the management terminal and forward the second setting information to the target 5G extension unit through the target 5G remote radio unit, the second setting information being determined after distribution configuration on a base station in each local electronic sports region;
  the second setting information sending module 20 is configured to forward the second setting information to the target building base band unit through the target 5G extension unit; and
  the second setting information forwarding module 21 is configured to forward the second setting information to the 5G core network through the target building base band unit, so that the 5G core network stores the second setting information, the second setting information including the service routing information associated with the target base station.

In some embodiments, the 5G private network includes a management terminal and a 5G core network deployed in the cloud; the permission verification request receiving module 22 is configured to receive a permission verification request sent by the management terminal, the permission verification request being generated by the management terminal for to-be-verified card information used by a to-be-verified electronic sports terminal;
  the permission verification request forwarding module 23 is configured to forward the permission verification request to the 5G core network, so that the 5G core network obtains status information of the to-be-verified card information from a status verification information table based on the permission verification request, the status verification information table being established by the third function network element in the 5G core network based on the card information of the electronic sports terminals in the at least two local electronic sports regions; and
  the status information receiving module 24 is configured to receive the status information returned by the 5G core network, and return the status information to the management terminal, so that the management terminal generates, based on the status information and the terminal access condition, notification information associated with the to-be-verified electronic sports terminal.

In some embodiments, the notification information is first notification information generated by the management terminal when determining that the to-be-verified electronic sports terminal satisfies the terminal access condition;
  the first notification information receiving module 25 is configured to receive the first notification information sent by the management terminal; and
  the first notification information sending module 26 is configured to send the first notification information to the to-be-verified electronic sports terminal, the first notification information being used for indicating that the to-be-verified electronic sports terminal succeeds in verification.

In some embodiments, the first notification information forwarding module 27 is configured to forward the first notification information to the 5G core network, so that the third function network element in the 5G core network changes the status information corresponding to the to-be-verified card information from a first status to a second status.

In some embodiments, the notification information is second notification information generated by the management terminal when determining that the to-be-verified electronic sports terminal does not satisfy the terminal access condition;

the second notification information receiving module 28 is configured to receive the second notification information sent by the management terminal; and the second notification information sending module 29 is configured to send the second notification information to the to-be-verified electronic sports terminal, the second notification information being used for indicating that the to-be-verified electronic sports terminal fails in verification.

In some embodiments, the apparatus further includes:

the second notification information forwarding module 30, configured to forward the second notification information to the 5G core network, so that the 5G core network searches for card information having same electronic sports account as the to-be-verified card information in the third function network element based on the second notification information, and delete card information except card information with latest card activation timestamps based on a card activation timestamp of the found card information.

In some embodiments, the target local electronic sports region includes M electronic sports terminals; M is a positive integer; the M electronic sports terminals include first electronic sports terminals belonging to a first electronic sports camp and second electronic sports terminals belonging to a second electronic sports camp; and the first electronic sports camp and the second electronic sports camp belong to different electronic sports camps.

In some embodiments, a quantity of target 5G remote radio units in the target base station is E, where E is a positive integer; each of the E target 5G remote radio units is configured to receive service data information; the service data information includes first service data information and second service data information; the first service data information is sent by the management terminal; and the second service data information is sent by the electronic sports terminal satisfying the terminal access condition in the target local electronic sports region.

Refer to the descriptions of steps S201 to S207 in the embodiment corresponding to FIG. 6 above for specific implementations of the electronic sports service data receiving module 11, the routing information obtaining module 12, the electronic sports service data sending module 13, the first setting information receiving module 14, the first setting information sending module 15, the first setting information forwarding module 16, the card activation request receiving module 17, the card activation request forwarding module 18, the second setting information receiving module 19, the second setting information sending module 20, the second setting information forwarding module 21, the permission verification request receiving module 22, the permission verification request forwarding module 23, the status information receiving module 24, the first notification information receiving module 25, the first notification information sending module 26, the first notification information forwarding module 27, the second notification information receiving module 28, the second notification information sending module 29, and the second notification information forwarding module 30.

Figure 9:
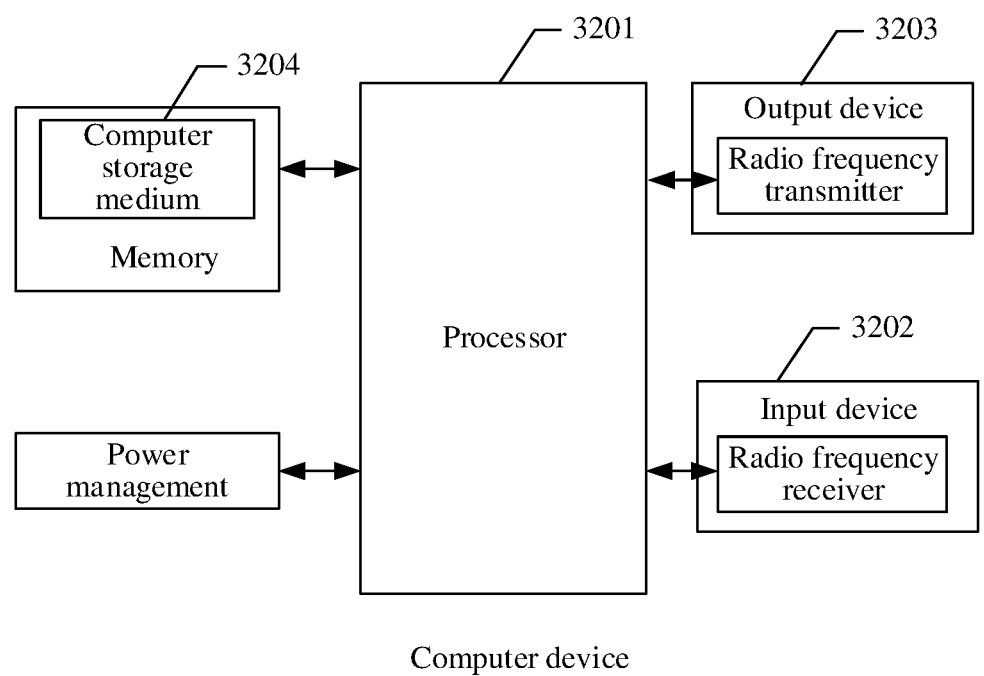
FIG. 9 is a schematic structural diagram of a computer device according to an embodiment of this application.

Further, refer to FIG. 9. FIG. 9 is a schematic structural diagram of a computer device according to an embodiment of this application. As shown in FIG. 9, the computer device may include at least a processor 3201, an input device 3202, an output device 3203, and a computer storage medium 3204. The processor 3201, the input device 3202, the output device 3203, and the computer storage medium 3204 may be connected through a bus or other means. The computer storage medium 3204 may be stored in a memory of the computer device, the computer storage medium 3204 is used for storing computer-readable instructions, the computer-readable instructions include program instructions, and the processor 3201 is configured to execute the program instructions stored in the computer storage medium 3204. The processor 3201 (or referred to as a central processing unit (CPU)) is a computing core and a control core of the computer device, is suitable for implementing one or more instructions, and is specifically suitable for loading and executing the one or more instructions to implement the corresponding method processes or corresponding functions.

An embodiment of this application further provides a computer storage medium (Memory) 3204. The computer storage medium is a memory of the computer device and is used for storing programs and data. The computer storage medium provides storage space, one or more instructions suitable for being loaded and executed by the processor 3201 are also stored in the storage space, and these instructions may be one or more computer-readable instructions (including program code). The computer storage medium here may be a high-speed random access memory (RAM), or a non-volatile memory, for example, at least one magnetic disk storage. Optionally, the computer storage medium may be at least one computer storage medium far away from the foregoing processor.

In one embodiment, the processor 3201 loads and executes the one or more instructions stored in the computer storage medium, and the computer device equipped with the processor 3201 is enabled to implement the methods shown in the embodiments in FIG. 3 to FIG. 7. In one embodiment, the computer device may perform the description of the electronic sports data processing method in the embodiment corresponding to FIG. 3 or FIG. 6 above, or the description of the electronic sports data processing apparatus 1 in the embodiment corresponding to FIG. 8.

In some embodiments, a computer program product is further provided, including computer-readable instructions, where the steps of each foregoing method embodiment are implemented when the computer-readable instructions are executed by a processor.

The processor of the computer device reads the computer instructions from the computer-readable storage medium, the processor executes the computer instructions, and the computer device is enabled to execute the description of the electronic sports data processing method in the embodiment corresponding to FIG. 3 or FIG. 6 above.

The terms "first", "second", and the like in the specification, claims, and the accompanying drawings of the embodiments of this application are used to distinguish different objects and are not used to describe a specific sequence. In addition, the term "include" and any variant thereof are intended to cover a non-exclusive inclusion. For example, a process, method, apparatus, product, or device that includes a series of steps or units is not limited to the listed steps or modules, but further optionally includes steps or modules that are not listed, or further optionally includes other steps or units that are intrinsic to the process, method, apparatus, product, or device. In this disclosure, processes or steps described in a certain order do not have to be performed in the order they are described, and can be performed in a different order or simultaneously.

A person of ordinary skill in the art may be aware that the units and algorithm steps of the examples described in the foregoing disclosed embodiments can be implemented by electronic hardware, computer software, or a combination thereof. To clearly describe the interchangeability between the hardware and the software, the foregoing has generally described compositions and steps of each example based on functions. Whether the functions are executed in a mode of hardware or software depends on particular applications and design constraint conditions of the technical solutions. A person skilled in the art may use different methods to implement the described functions for each particular application, but the implementation is not beyond the scope of this application.

The method and related apparatus provided in the embodiments of this application are described with reference to the method flowcharts and/or schematic structural diagrams provided in the embodiments of this application. Specifically, each process and/or block in the method flowcharts and/or schematic structural diagrams and a combination of processes and/or blocks in the flowcharts and/or block diagrams may be implemented by the computer-readable instructions. These computer-readable instructions may be provided to a general-purpose computer, a dedicated computer, an embedded processor, or a processor of another programmable electronic sports data processing device to generate a machine, so that the instructions executed by the computer or the processor of the another programmable electronic sports data processing device generate an apparatus for implementing a specific function in one or more processes in the flowcharts and/or in one or more blocks in the schematic structural diagrams. These computer program instructions may also be stored in a computer-readable memory that can instruct a computer or another programmable electronic sports data processing device to work in a specific manner, so that the instructions stored in the computer-readable memory generate an artifact that includes an instruction apparatus. The instruction apparatus implements a specific function in one or more processes in the flowcharts and/or in one or more blocks in the schematic structural diagrams. These computer-readable instructions may also be loaded onto a computer or another programmable electronic sports data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the schematic structural diagrams.

What is disclosed above is merely exemplary embodiments of this application, and certainly is not intended to limit the scope of the claims of this application. Therefore, equivalent variations made in accordance with the claims of this application still fall within the scope of this application.

What is claimed is:

1. An electronic sports data processing method, performed by a target base station in a target local electronic sports region and comprising:
in response to an electronic sports terminal in the target local electronic sports region being determined by a 5G private network to satisfy a terminal access condition, receiving electronic sports service data carrying access identification information transmitted by the electronic sports terminal, the target local electronic sports region being one of at least two local electronic sports regions deployed in the 5G private network, the 5G private network comprising a 5G core network deployed in a cloud, and one or more electronic sports terminals, a base station, and a local electronic sports server deployed in each of the at least two local electronic sports regions, the base station deployed in the target local electronic sports region comprising the target base station, the local electronic sports server deployed in the target local electronic sports region comprising a target local electronic sport server corresponding to the access identification information;
searching, in service routing information associated with the target base station in the target local electronic sports region, for target service routing information that is same as the access identification information; and
transmitting the electronic sports service data to the target local electronic sports server corresponding to the access identification information upon finding the target service routing information, so that the target local electronic sports server obtains electronic sports response data of an electronic sports service based on the electronic sports service data.

2. The method according to claim 1,
wherein:
the target base station includes a target 5G remote radio unit, a target 5G extension unit, and a target building base band unit; and
the 5G private network includes a management terminal and a 5G core network deployed in a cloud;
the method further comprising:
receiving setting information transmitted by the management terminal and forwarding the setting information to the target 5G extension unit through the target 5G remote radio unit, the setting information being determined based on network elements in the 5G core network;
forwarding the setting information to the target building base band unit through the target 5G extension unit; and
forwarding the setting information to the 5G core network through the target building base band unit, so that the 5G core network stores the setting information.

3. The method according to claim 2, wherein:
the 5G core network includes:
a first function network element configured to implement access and mobility management functions;
a second function network element configured to implement a session management function; and
a third function network element configured to implement unified data management; and
forwarding the setting information to the 5G core network through the target building base band unit includes:
forwarding the setting information to the first function network element through the target building base band unit, so that the first function network element forwards the setting information to the second function network element, the second function network element being further configured to store the setting information to the third function network element.

4. The method according to claim 3, further comprising:
receiving a card activation request transmitted by the management terminal, the card activation request carrying card information of an electronic sports card; and
forwarding the card activation request to the first function network element through the target building base band unit, so that the first function network element forwards the card activation request to the second function network element, the second function network element being further configured to authenticate the card activation request based on the setting information and the card information, and store the card information in the third function network element in response to the authentication being successful, and the card information stored in the third function network element being card information corresponding to electronic sports cards used by electronic sports terminals in the at least two local electronic sports regions.

5. The method according to claim 2,
wherein the setting information is first setting information;
the method further comprising:
receiving second setting information transmitted by the management terminal and forwarding the second setting information to the target 5G extension unit through the target 5G remote radio unit, the second setting information being determined after distribution configuration on base stations in the at least two local electronic sports regions is performed;
forwarding the second setting information to the target building base band unit through the target 5G extension unit; and
forwarding the second setting information to the 5G core network through the target building base band unit, so that the 5G core network stores the second setting information, the second setting information including the service routing information associated with the target base station.

6. The method according to claim 1,
wherein the 5G private network includes a management terminal and a 5G core network deployed in a cloud;
the method further comprising:
receiving a permission verification request transmitted by the management terminal, the permission verification request being generated by the management terminal for candidate card information used by a candidate electronic sports terminal to be verified;
forwarding the permission verification request to the 5G core network, so that the 5G core network obtains status information of the candidate card information from a status verification information table based on the permission verification request, the status verification information table being established based on card information of electronic sports terminals in the at least two local electronic sports regions; and
receiving the status information returned by the 5G core network, and returning the status information to the management terminal, so that the management terminal generates, based on the status information and the terminal access condition, notification information associated with the candidate electronic sports terminal.

7. The method according to claim 6,
wherein the notification information is generated by the management terminal in response to determining that the candidate electronic sports terminal satisfies the terminal access condition;
the method further comprising:
receiving the notification information transmitted by the management terminal; and
transmitting the notification information to the candidate electronic sports terminal, to indicate that the candidate electronic sports terminal succeeds in verification.

8. The method according to claim 7, further comprising:
forwarding the notification information to the 5G core network, so that a function network element in the 5G core network changes the status information corresponding to the candidate card information from a first status to a second status, the function network element being configured to implement unified data management.

9. The method according to claim 6,
wherein the notification information is generated by the management terminal in response to determining that the candidate electronic sports terminal does not satisfy the terminal access condition;
the method further comprising:
receiving the notification information transmitted by the management terminal; and
transmitting the notification information to the candidate electronic sports terminal, to indicate that the candidate electronic sports terminal fails in verification.

10. The method according to claim 9, further comprising:
forwarding the notification information to the 5G core network, so that the 5G core network searches for card information having same electronic sports account as the candidate card information in a function network element based on the notification information, and deletes card information except card information with latest card activation timestamps based on one or more card activation timestamps of the found card information, the function network element being configured to implement unified data management.

11. The method according to claim 1, wherein the target local electronic sports region includes a plurality of electronic sports terminals including:
a first electronic sports terminal belonging to a first electronic sports camp; and
a second electronic sports terminal belonging to a second electronic sports camp different from the first electronic sports camp.

12. The method according to claim 1, wherein the target base station includes a plurality of target 5G remote radio units each configured to receive first service data information transmitted by a management terminal of the 5G private network and second service data information transmitted by the electronic sports terminal satisfying the terminal access condition in the target local electronic sports region.

13. A computer device comprising:
one or more memories storing one or more computer-readable instructions; and
one or more processors configured to execute the one or more instructions to:
in response to an electronic sports terminal in a target local electronic sports region being determined by a 5G private network to satisfy a terminal access condition, receive, at a target base station, electronic sports service data carrying access identification information transmitted by the electronic sports terminal, the target local electronic sports region being one of at least two local electronic sports regions deployed in the 5G private network, the 5G private network comprising a 5G core network deployed in a cloud, and one or more electronic sports terminals, a base station, and a local electronic sports server deployed in each of the at least two local electronic sports regions, the base station deployed in the target local electronic sports region comprising the target base station, the local electronic sports server deployed in the target local electronic sports region comprising a target local electronic sport server corresponding to the access identification information;

search, in service routing information associated with the target base station in the target local electronic sports region, for target service routing information that is same as the access identification information; and transmit the electronic sports service data to the target local electronic sports server corresponding to the access identification information upon finding the target service routing information, so that the target local electronic sports server obtains electronic sports response data of an electronic sports service based on the electronic sports service data.

14. The computer device according to claim 13, wherein:
the target base station includes a target 5G remote radio unit, a target 5G extension unit, and a target building base band unit;
the 5G private network includes a management terminal and a 5G core network deployed in a cloud; and
the one or more processors are configured to execute the one or more instructions to:
receive setting information transmitted by the management terminal and forward the setting information to the target 5G extension unit through the target 5G remote radio unit, the setting information being determined based on network elements in the 5G core network;
forward the setting information to the target building base band unit through the target 5G extension unit; and
forward the setting information to the 5G core network through the target building base band unit, so that the 5G core network stores the setting information.

15. The computer device according to claim 14, wherein:
the 5G core network includes:
a first function network element configured to implement access and mobility management functions;
a second function network element configured to implement a session management function; and
a third function network element configured to implement unified data management; and
the one or more processors are configured to execute the one or more instructions to:
forward the setting information to the first function network element through the target building base band unit, so that the first function network element forwards the setting information to the second function network element, the second function network element being further configured to store the setting information to the third function network element.

16. The computer device according to claim 15, wherein the one or more processors are configured to execute the one or more instructions to:
receive a card activation request transmitted by the management terminal, the card activation request carrying card information of an electronic sports card; and
forward the card activation request to the first function network element through the target building base band unit, so that the first function network element forwards the card activation request to the second function network element, the second function network element being further configured to authenticate the card activation request based on the setting information and the card information, and store the card information in the third function network element in response to the authentication being successful, and the card information stored in the third function network element being card information corresponding to electronic sports cards used by electronic sports terminals in the at least two local electronic sports regions.

17. The computer device according to claim 14, wherein:
the setting information is first setting information; and
the one or more processors are configured to execute the one or more instructions to:
receive second setting information transmitted by the management terminal and forward the second setting information to the target 5G extension unit through the target 5G remote radio unit, the second setting information being determined after distribution configuration on base stations in the at least two local electronic sports regions is performed;
forward the second setting information to the target building base band unit through the target 5G extension unit; and
forward the second setting information to the 5G core network through the target building base band unit, so that the 5G core network stores the second setting information, the second setting information including the service routing information associated with the target base station.

18. The computer device according to claim 13, wherein:
the 5G private network includes a management terminal and a 5G core network deployed in a cloud; and
the one or more processors are configured to execute the one or more instructions to:
receive a permission verification request transmitted by the management terminal, the permission verification request being generated by the management terminal for candidate card information used by a candidate electronic sports terminal to be verified;
forward the permission verification request to the 5G core network, so that the 5G core network obtains status information of the candidate card information from a status verification information table based on the permission verification request, the status verification information table being established based on card information of electronic sports terminals in the at least two local electronic sports regions; and
receive the status information returned by the 5G core network, and returning the status information to the management terminal, so that the management terminal generates, based on the status information and the terminal access condition, notification information associated with the candidate electronic sports terminal.

19. The computer device according to claim 18, wherein:
the notification information is generated by the management terminal in response to determining that the candidate electronic sports terminal satisfies the terminal access condition; and
the one or more processors are configured to execute the one or more instructions to:
receive the notification information transmitted by the management terminal; and
transmit the notification information to the candidate electronic sports terminal, to indicate that the candidate electronic sports terminal succeeds in verification.

20. One or more non-transitory readable storage medium, storing one or more computer-readable instructions that, when executed by one or more processors, cause the one or more processors to:
in response to an electronic sports terminal in a target local electronic sports region being determined by a 5G private network to satisfy a terminal access condition, receive, at a target base station, electronic sports service data carrying access identification information transmitted by the electronic sports terminal, the target local electronic sports region being one of at least two local electronic sports regions deployed in the 5G private network, the 5G private network comprising a 5G core network deployed in a cloud, and one or more electronic sports terminals, a base station, and a local electronic sports server deployed in each of the at least two local electronic sports regions, the base station deployed in the target local electronic sports region comprising the target base station, the local electronic sports server deployed in the target local electronic sports region comprising a target local electronic sport server corresponding to the access identification information;
search, in service routing information associated with the target base station in the target local electronic sports region, for target service routing information that is same as the access identification information; and
transmit the electronic sports service data to the target local electronic sports server corresponding to the access identification information upon finding the target service routing information, so that the target local electronic sports server obtains electronic sports response data of an electronic sports service based on the electronic sports service data.

* * * * *